US012542218B2

(12) United States Patent
Gatlin

(10) Patent No.: US 12,542,218 B2
(45) Date of Patent: Feb. 3, 2026

(54) SHIELDED RADIOACTIVE STORAGE DEVICE

(71) Applicant: Derek Gatlin, Hampden, ME (US)

(72) Inventor: Derek Gatlin, Hampden, ME (US)

( * ) Notice: Subject to any disclaimer, the term of this patent is extended or adjusted under 35 U.S.C. 154(b) by 159 days.

(21) Appl. No.: 18/533,065

(22) Filed: Dec. 7, 2023

(65) Prior Publication Data

US 2025/0191797 A1 Jun. 12, 2025

(51) Int. Cl.
*G21F 5/12* (2006.01)
*G21F 1/08* (2006.01)

(52) U.S. Cl.
CPC ................ *G21F 5/12* (2013.01); *G21F 1/085* (2013.01)

(58) Field of Classification Search
None
See application file for complete search history.

(56) References Cited

U.S. PATENT DOCUMENTS 3,655,981 A * 4/1972 Montgomery .......... G21F 5/015 604/407
2006/0045229 A1 3/2006 Balestracci
2014/0226777 A1* 8/2014 Singh ........................ G21F 5/10 376/272
2021/0012917 A1 1/2021 Nunn

FOREIGN PATENT DOCUMENTS

AU 2016100141 A4 3/2016
CN 107705866 A 2/2018
CN 208559443 U 3/2019
CN 213025420 U 4/2021
CN 216833809 U 6/2022
GB 2591527 A 8/2021

OTHER PUBLICATIONS

CHT Sheilded Transport Trolley for Radiopharmaceutical Drug, Lemerpax Catalog Sheet, Updated Jun. 2022.
International Search Report and Written Opinion issued in related International Patent Application No. PCT/US2024/058801, mailed Mar. 4, 2025, 8 pgs.
International Search Report and Written Opinion issued in corresponding International Patent Application No. PCT/US2024/058791, mailed Feb. 10, 2025, 6 pgs.

* cited by examiner

*Primary Examiner* — Andrew Smyth
(74) *Attorney, Agent, or Firm* — Verrill Dana, LLP; Robert L. Hover

(57) ABSTRACT

Provided herein shielded radioactive storage devices including a hollow body defining an interior cavity, a first well positioned within the interior cavity, including a first well casing, and defining a first well cavity having a first well opening, the first well cavity and first well opening sized to receive a radioactive payload, a second well positioned within the interior cavity, including a second well casing, and defining a second well cavity having a second well opening, the second well cavity and second well opening sized to receive a second radioactive payload, a shield casing extending around and spaced apart from the first and second well casings to form a shielding cavity between the shield casing and the first and second well casings, and radiation shielding material filling the shielding cavity to surround the first and second well casings.

22 Claims, 24 Drawing Sheets

Table 1: 13 Most Commonly used Isotopes in Radiopharmaceuticals.

| Isotope | Gamma/X-Ray keV | % Abundance | Beta keV | % Abundance | Alpha keV | % Abundance | Accecible dose rate background | Storage Shielding Gamma X-Ray Dose Rate Reduction 90% | Storage Shielding Bata Dose Rate Reduction 100% | Storage Shielding Required for Alpha |
|---|---|---|---|---|---|---|---|---|---|---|
| Cesium-137 | 662 | 85 | 174 | 94 | N/A | N/A | < 2 mR/hr | 22 mm Pb | 4 mm Plastic | N/A |
| | 32 | 6 | 624 | 8 | | | | | | |
| | | | 426 | 6 | | | | | | |
| | | | 656 | 1 | | | | | | |
| Chromium-51 | 320 | 9.8 | N/A | N/A | N/A | N/A | < 2 mR/hr | 13 mm Pb | N/A | N/A |
| | 5 | 22 | | | | | | | | |
| Copper-64 | 511 | 35 | 190 | 39 | N/A | N/A | < 2 mR/hr | 16 mm Pb | 2 mm Plastic | N/A |
| | | | 278(+) | 17 | | | | | | |
| Fluorine-18 | 511 | 194 | 250(+) | 97 | N/A | N/A | < 2 mR/hr | 15 mm Pb | 2 mm Plastic | N/A |
| Iodine-123 | 159 | 83 | 127 | 14 | N/A | N/A | < 2 mR/hr | 12 mm Pb | 3 mm Plastic | N/A |
| | 27 | 72 | 23 | 9 | | | | | | |
| | 31 | 13 | 27 | 4 | | | | | | |
| | 32 | 2 | 154 | 2 | | | | | | |
| Iodine-131 | 364 | 82 | 192 | 90 | N/A | N/A | < 2 mR/hr | 10 mm Pb | 16 mm Plastic | N/A |
| | 637 | 7 | 97 | 7 | | | | | | |
| | 284 | 6 | 46 | 4 | | | | | | |
| | 80 | 3 | 69 | 2 | | | | | | |
| Molybdenum-99 | 141 | 89 | 443 | 82 | N/A | N/A | < 2 mR/hr | 20 mm Pb | 4mm plastic | N/A |
| | 740 | 12 | 133 | 10 | | | | | | |
| | 181 | 6 | 119 | 9 | | | | | | |
| | 18 | 6 | 20 | 4 | | | | | | |
| Selinium-75 | 265 | 59 | 10 | 9 | N/A | N/A | < 2 mR/hr | 44 mm Pb | 0.2 mm Plastic | N/A |
| | 136 | 58 | 13 | 5 | | | | | | |
| | 11 | 32 | 85 | 3 | | | | | | |
| | 280 | 25 | 124 | 2 | | | | | | |
| Sodium-22 | 511 | 180 | 215(+) | 90 | N/A | N/A | < 2 mR/hr | 36 mm Pb | 1.4 mm Plastic | N/A |
| | 1275 | 100 | | | | | | | | |
| Stontium-89 | N/A | N/A | 585 | 199 | N/A | N/A | < 2 mR/hr | N/A | 5.3 mm Plastic | N/A |
| Technetium-99m | 141 | 89 | 119 | 9 | N/A | N/A | < 2 mR/hr | 0.9 mm Pb | 0.3 mm plastic | N/A |
| | 18 | 6 | 15 | 2 | | | | | | |
| | | | 137 | 1 | | | | | | |
| Thallium-201 | 71 | 46 | 84 | 16 | N/A | N/A | < 2 mR/hr | 0.9 mm Pb | 0.3 Plastic | |
| | 68 | 27 | 16 | 9 | | | | | | |
| | 12 | 11 | 17 | 8 | | | | | | |
| | 167 | 10 | 52 | 7 | | | | | | |
| Zenon-133 | 81 | 38 | 101 | 99 | N/A | N/A | < 2 mR/hr | 0.4 mm Pb | 0.8 mm Plastic | N/A |
| | 31 | 41 | 45 | 55 | | | | | | |
| | 35 | 8 | 75 | 7 | | | | | | |
| | 35 | 1 | 25 | 4 | | | | | | |

FIG. 5

SHIELDED RADIOACTIVE STORAGE DEVICE

BACKGROUND

Existing radiopharmaceutical storage generally includes a flat table for placement of a radiopharmaceutical generator thereon and a plurality of lead rings for stacking around the generator to form a stacked-ring cylinder. In practice, such setups suffer from a number of hygienic, radiation exposure, and other employee health and safety concerns.

With respect to sanitation and cleanroom hygiene, in order to reduce bacteria growth in the generator storage area, each ring must be individually removed and cleaned with anti-bacterial solutions and alcohol. However, this method is both time-consuming and cumbersome due to the weight and number of rings. Because of this, staff have been known to sometimes clean around the exterior of the assembled cylinder of stacked rings, rather than separating and individually cleaning them. This increases the potential for bacterial growth between the rings, which may then become airborne, causing contamination and health hazards.

In addition, because the stacked-ring cylinders extend vertically above the table and include discontinuities between the rings along the vertical surface of the cylinder, these stacked-ring cylinders interrupt air flow around and above the radiopharmaceutical generators, creating turbulent air flows. These turbulent airflows introduce eddies into the airflow, causing stagnant pockets to develop where air is trapped in place proximate the generators, which, when combined with the vertical height of the stacked-ring cylinder above the table, these stagnant pockets interfere with air exchange around the generators, increasing likelihood of contamination.

With respect to radiation exposure, current lead rings can be of any thickness but, because of the nature of rings, the stacked-ring cylinders provide only minimal shielding above and below the generator. Thus, staff regularly using such setups can be exposed to under-shielded radioactive materials.

Furthermore, the weight of such heavy lead rings, and the repetitive nature of various tasks undertaken when removing generators from and/or cleaning such stacked-ring setups presents many employee health and safety risks, including those physical risks typically associated with the handling of heavy and/or toxic objects. Such risks include pinch hazards, muscle strains, crush events, and exposure to lead.

SUMMARY

Shielded radioactive storage devices are described herein, each including a hollow body, storage wells formed therein, and lids for covering each well. Radiation shielding material is provided along the bottom and sides of each well and in each lid. In addition, all radiation shielding material is fully enclosed within a non-toxic, hermetically sealed casing. The wells can be positioned within the hollow body to maximize storage capacity within the storage device and to at least partially share radiation shielding material. This compact, space saving design reduces the footprint used when compared to traditional tables as well as reducing a total required amount of radiation shielding material for storing multiple radioactive payloads. In some embodiments, the shielded radioactive storage devices can also include a lid sliding system to aid in opening and closing the well during insertion, extraction, and use of the radioactive payloads.

In one aspect, a shielded radioactive storage device is provided. The shielded radioactive storage device includes a hollow body having an upper wall, a bottom wall, and at least one side wall defining an interior cavity. The shielded radioactive storage device also includes a first well positioned within the interior cavity and including a first well casing having a first well casing bottom and a first well casing side defining a first well cavity having a first well opening defined as a first aperture formed in the upper wall of the hollow body, the first well cavity and first well opening sized to receive a radioactive payload. The shielded radioactive storage device also includes a second well positioned within the interior cavity and including a second well casing having a second well casing bottom and a second well casing side defining a second well cavity having a second well opening defined as a second aperture formed in the upper wall of the hollow body, the second well cavity and second well opening sized to receive a second radioactive payload. The shielded radioactive storage device also includes a shield casing having a shield casing bottom and a shield casing side extending around and spaced apart from the first and second well casing bottoms and the first and second well casing sides to form a shielding cavity between the shield casing and the first and second well casings. The shielded radioactive storage device also includes radiation shielding material filling the shielding cavity to surround the first and second well casing sides and first and second well casing bottoms.

In some embodiments, at least a portion of the shield casing is attached to the side wall of the hollow body. In some embodiments, the shielded radioactive storage device also includes a structural frame including structural members extending along the bottom wall, side wall, and upper wall. In some embodiments, the shield casing bottom is in supportive contact with at least one support member extending through the interior cavity below the shield casing bottom. In some embodiments, the shielded radioactive storage device also includes a first lid sized to cover the first well opening. In some embodiments, the shielded radioactive storage device also includes a second lid sized to cover the second well opening. In some embodiments, each of the first and second lids including a lid casing having lid radiation shielding material disposed therein. In some embodiments, the lid casing of each of the first and second lids including a handle attached thereto. In some embodiments, the shielded radioactive storage device also includes a center rail extending along the upper wall of the hollow body between the first and second well openings. In some embodiments, the shielded radioactive storage device also includes a first outer rail extending parallel to the center rail along or tangent to a side of the first well opening opposite the center rail. In some embodiments, the shielded radioactive storage device also includes a second outer rail extending parallel to the center rail along or tangent to a side of the second well opening opposite the center rail.

In some embodiments, the shielded radioactive storage device also includes a first center carriage configured to move along the center rail in a first direction. In some embodiments, the shielded radioactive storage device also includes a first outer carriage configured to move along the first outer rail in the first direction. In some embodiments, the shielded radioactive storage device also includes a second center carriage configured to move along the center rail in a second direction. In some embodiments, the shielded radioactive storage device also includes a second outer carriage configured to move along the second outer rail in the second direction. In some embodiments, each of the first outer carriage, the first center carriage, the second center carriage, and the second outer carriage includes a pin extending therefrom. In some embodiments, the first and second lid each include opposing mounting brackets extending therefrom. In some embodiments, the mounting brackets of the first lid configured to engage with the respective pins of the first outer carriage and the first center carriage for sliding along the center rail and the first outer rail between a first closed position covering the first well opening and a first open position uncovering the first well opening. In some embodiments, the mounting brackets of the second lid configured to engage with the respective pins of the second outer carriage and the second center carriage for sliding along the center rail and the second outer rail between a second closed position covering the second well opening and a second open position uncovering the second well opening. In some embodiments, at least one of the first outer rail, the center rail, the first outer carriage, the first center carriage, or combinations thereof include a first stop mechanism to retain the first lid in the first closed and/or first open position and at least one of the second outer rail, the center rail, the second outer carriage, the second center carriage, or combinations thereof include a second stop mechanism to retain the second lid in the second closed and/or second open position. In some embodiments, the first and second lids, in the respective first and second closed positions, are spaced apart from the upper wall of the hollow body.

In some embodiments, the hollow body includes one or more legs extending outward from the bottom wall. In some embodiments, at least one of the legs includes a caster. In some embodiments, the radiation shielding material filling the shielding cavity is at least one of lead or tungsten. In some embodiments, a thickness of the radiation shielding material filling the shielding cavity surrounding the first and second well casing sides and first and second well casing bottoms meets legal and/or industry standard shielding requirements for an isotope of a radioactive payload to be stored. In some embodiments, the radioactive payload to be stored is a radiopharmaceutical elution generator. In some embodiments, the radiation shielding material filling the shielding cavity surrounding the first and second well casing sides and first and second well casing bottoms is between 6 mm to 50.8 mm thick. In some embodiments, the first and second well casings, the shield casing, and the hollow body are each constructed of at least one of iron, steel, stainless steel, tungsten, aluminum, metal alloys, composite materials, or combinations thereof. In some embodiments, the hollow body includes two opposing side walls and wherein the shield casing is attached to each of the opposing side walls. In some embodiments, a shape of each of the first and second well openings is one or more of circular, square, rectangular, rhombic, pentagonal, hexagonal, pentangular, star-shaped, polygonal, triangular, or combinations thereof. In some embodiments, a cross-sectional area of a portion of the shielding cavity between the shield casing bottom and the first and second well casing bottoms is smaller than a cross-sectional area of the shielding cavity between the first and second well casing bottoms and the upper wall of the hollow body.

BRIEF DESCRIPTION OF THE DRAWINGS

FIG. 5 illustrates a table of commonly used radiopharmaceutical isotopes and corresponding shielding types and thicknesses.

DETAILED DESCRIPTION

Figure 1B:
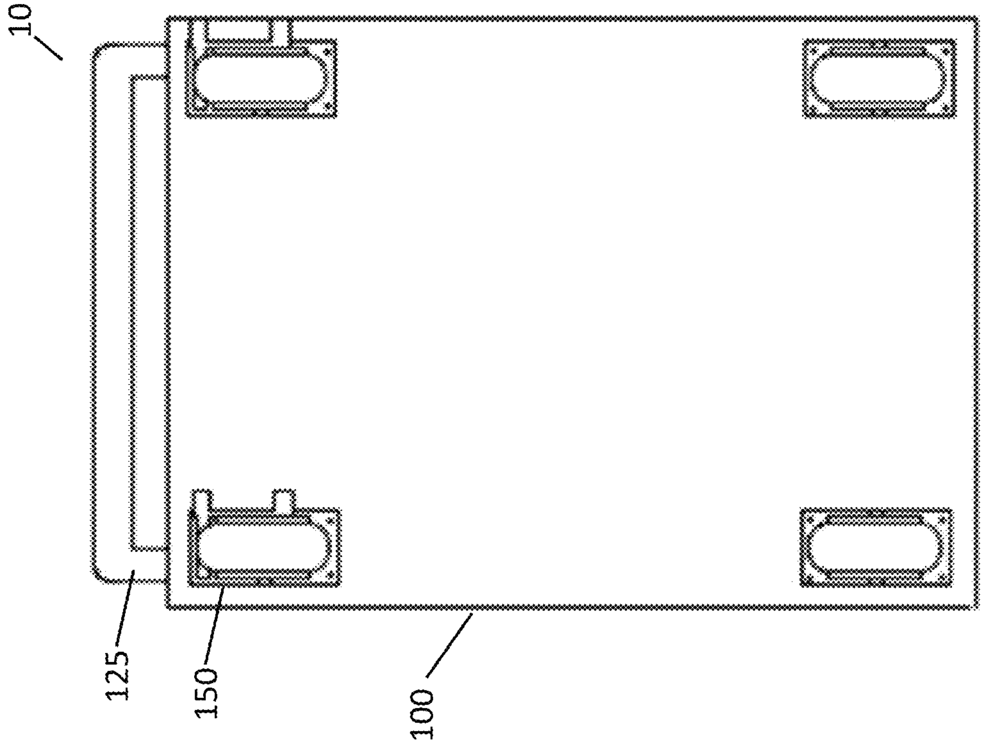
FIG. 1B illustrates a bottom view of the shielded radioactive storage device of FIG. 1A.
Figure 1A:
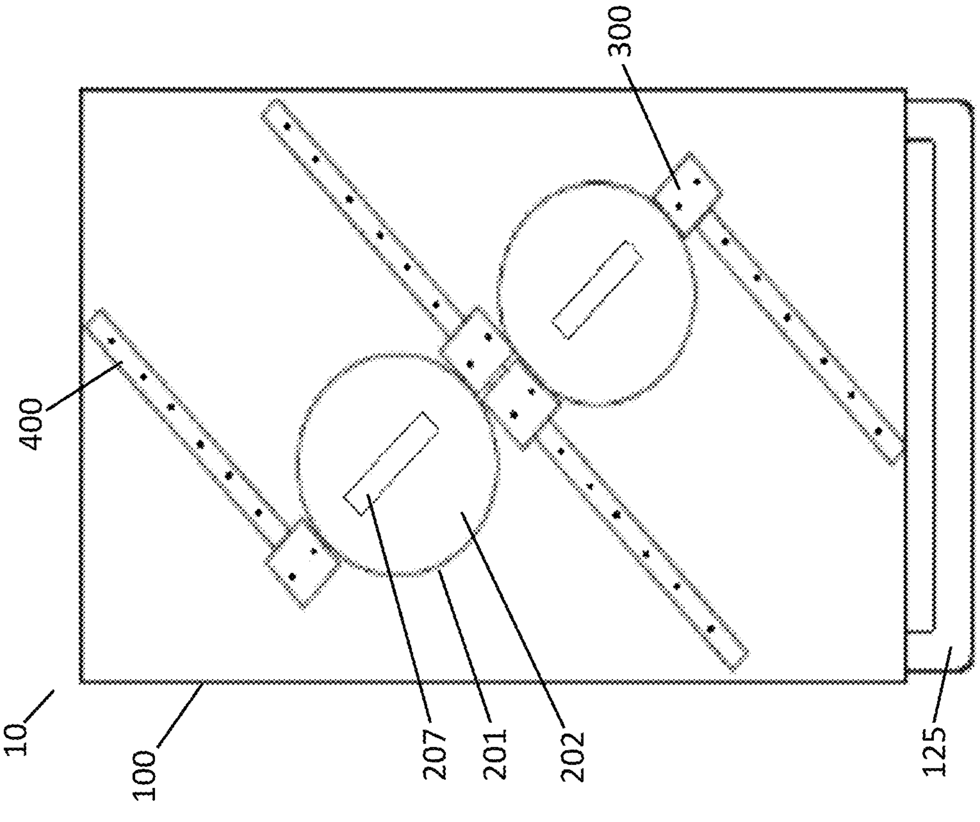
FIG. 1A illustrates a top view of a shielded radioactive storage device in accordance with various embodiments.
Figure 1D:
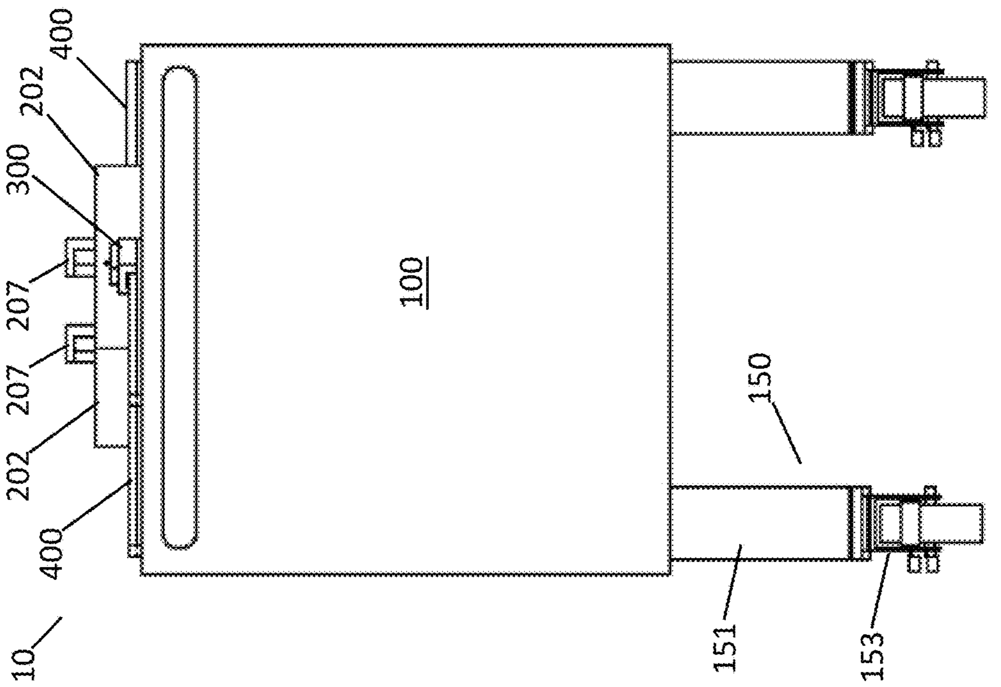
FIG. 1D illustrates a back view of the shielded radioactive storage device of FIG. 1A.
Figure 1C:
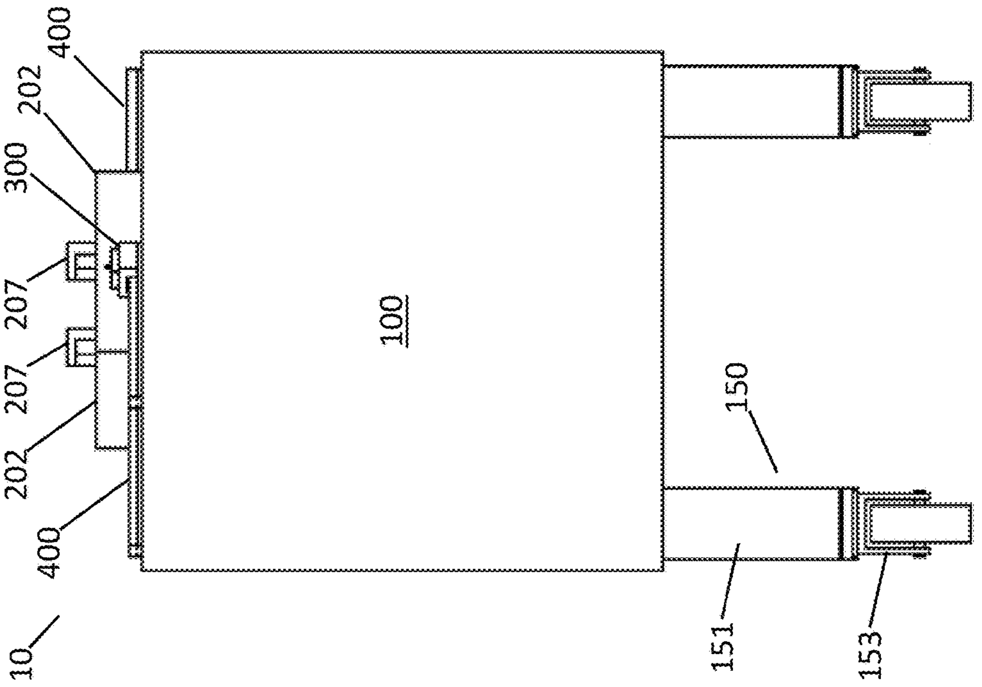
FIG. 1C illustrates a front view of the shielded radioactive storage device of FIG. 1A.
Figure 1F:
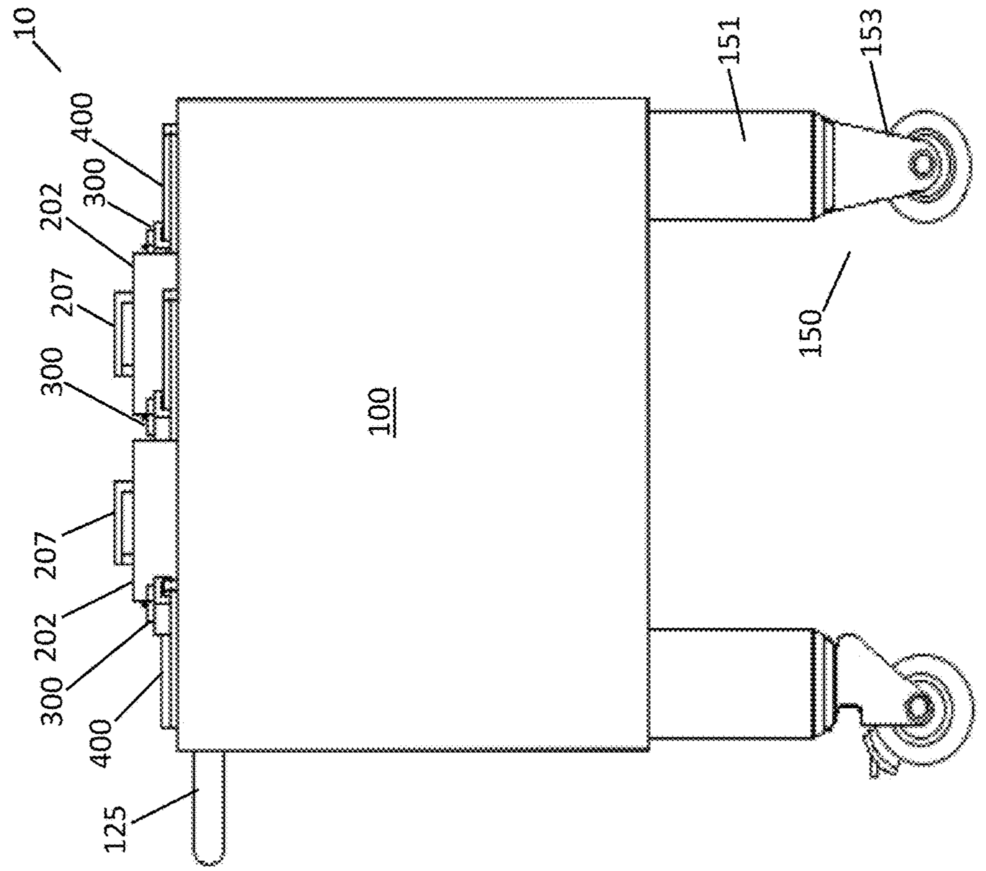
FIG. 1F illustrates a right view of the shielded radioactive storage device of FIG. 1A.
Figure 1E:
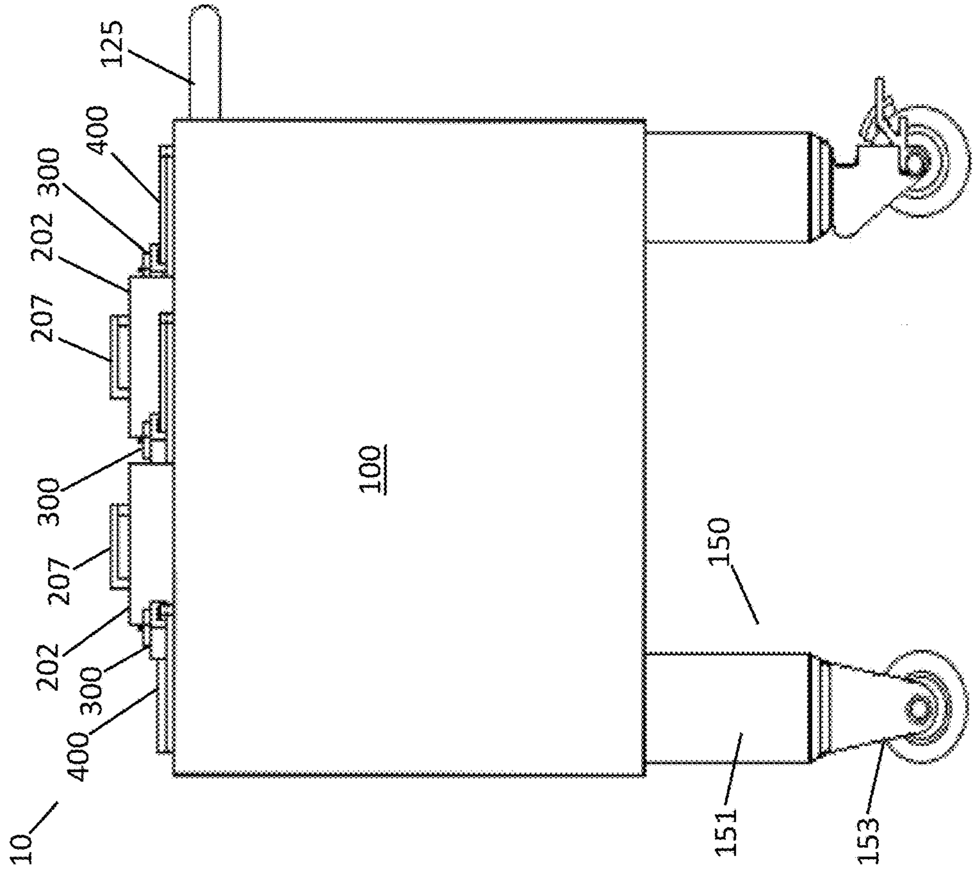
FIG. 1E illustrates a left view of the shielded radioactive storage device of FIG. 1A.

Provided herein are shielded radioactive storage devices. The shielded radioactive storage devices each include a hollow body, storage wells formed therein, and lids for covering each well. Radiation shielding material (e.g., lead) is provided along the bottom and sides of each well and in each lid. In addition, all radiation shielding material is fully enclosed within a non-toxic, hermetically sealed casing (e.g., stainless steel). The wells can be positioned within the hollow body to maximize storage capacity within the storage device and to at least partially share radiation shielding material. This compact, space saving design reduces the footprint used when compared to traditional tables as well as reducing a total required amount of radiation shielding material for storing multiple radioactive payloads. In some embodiments, the shielded radioactive storage devices can also include a lid sliding system to aid in opening and closing the well during insertion, extraction, and use of the radioactive payloads. Although illustrated and described herein in the context of radiopharmaceutical elution generator storage, the shielded radioactive storage devices described herein can be used in connection with the storage of any radioactive material, including, for example, generator storage, tool contamination decay shielding, shielding of testing materials for medical, academic, government, agricultural, and/or private use (e.g., for experimentation, commercial, or other use), nuclear fuel and/or waste storage, or combinations thereof.

In the context of radiopharmaceutical elution generator storage, the shielded radioactive storage devices described herein advantageously provide a safer and more efficient way of maintaining cleanroom hygiene. In particular, because each well is surrounded by radiation shielding, radiation exposure is minimized. In addition, because the radiation shielding material is fully enclosed by a non-toxic, hermetically sealed casing, health and safety concerns surrounding lead exposure are eliminated. Furthermore, the smooth casing surfaces minimizes turbulence-causing flow obstructions, thereby avoiding stagnant air pockets. Still further, because the wells include a continuous, smooth surface and do not need to be moved for cleaning, the likelihood of proper cleaning is increased and employee health and safety concerns are resolved by eliminating the need for repetitive lifting, moving, and handling of heavy components for cleaning operations. These benefits are even more pronounced for embodiments including the lid sliding system, which eliminates the need for manual removal of the heavy lids and presents fewer obstacles when inserting, removing, eluting, or otherwise using the stored radiopharmaceutical generators.

Referring now to FIGS. 1A-1I, a shielded radioactive storage device 10 includes a hollow body 100 having an interior cavity 101. The hollow body 100 can preferably be an enclosed body constructed from, for example, stainless steel, aluminum, tungsten, other metals, composites, plastics, combinations thereof, or any other suitable material. The hollow body 100, although shown as having a rectangular prism or box shape, can take any other suitable shape including, for example, an egg shape, a cylindrical shape, an elliptical prism, or any other suitable shape. In some embodiments, the hollow body can also include a structural frame integrated with and/or attached thereto including one or more structural members 175 (e.g., top, bottom, and side corner angle irons 175 as shown) to better support the weight of heavy radiation shielding material 108. The structural members 175 can be constructed from any material capable of withstanding the weight of the shielded radioactive storage device 10 without structural failure.

Within the hollow body 100, the storage device 10 includes one or more well casings 105 (e.g., two as shown) positioned in the interior cavity 101, each well casing 105 having a closed bottom and at least one side. The well casing 105 forms a well cavity 103 having an opening defined as an aperture in an upper surface of the hollow body 100, to which the open end of the well casing 105 is attached. The well cavity 103 and opening can be sized and shaped to receive and accommodate a relevant radioactive payload or payloads. For example, in some embodiments, each of the well cavity openings can be one or more of circular, square, rectangular, rhombic, pentagonal, hexagonal, pentangular, star-shaped, polygonal, triangular, or combinations thereof and similarly, each well cavity 103 and corresponding well casing 105 can have any suitable shape, whether having a constant or variable cross-sectional geometry throughout a depth thereof. The well casing 105 can be constructed from, for example, stainless steel, aluminum, tungsten, other metals, composites, plastics, combinations thereof, or any other suitable material.

A shield casing 109 is positioned in the interior cavity 101 of the hollow body 100, the shield casing 109 having a closed bottom and at least one side such that the shield casing 109 extends around and is spaced apart from one or more of the well casings 105 to form a shielding cavity 107 therebetween. In some embodiments, a lower portion 111 of the shield casing 109 positioned below the bottom of the well casing 105 can have a smaller cross-sectional area than the upper portions of the shield casing 109. This configuration takes advantage of the well casing geometry to minimize the size of the shielding cavity 107, thereby minimizing the required amount and weight of radiation shielding material 108 used while maintaining a minimum desired shielding thickness relative to the well casings 105 in all dimensions. However, in some embodiments the shield casing 109 may instead have a consistent cross-sectional area throughout a depth thereof and/or the lower portion 111 may increase in cross-sectional area. More generally, the shield casing 109 may have any suitable shape, whether of constant or varying geometry throughout its depth, for defining the shielding cavity 107 surrounding one or more of the well casings 105. The shielding casing 109 can be constructed from, for example, stainless steel, aluminum, tungsten, other metals, composites, plastics, combinations thereof, or any other suitable material.

Depending on the intended application, the shielding cavity 107 can be filled with any suitable and effective radiation shielding material 108 such as lead, tungsten, high density concrete, borated polyethylene, metal impregnated polymers, aluminum, or any other suitable materials. The thickness of the radiation shielding material 108 can be configured with any suitable thickness depending on the type and size of a radioactive payload to be stored in the well cavities 103. Types and thicknesses of radiation shielding material 108 for common radiopharmaceutical isotopes are shown in FIG. 5 and, in some embodiments, the shielding cavity 107 can be sized to accommodate radiation shielding material 108 matching or exceeding any one or more such thicknesses. In some embodiments, the radiation shielding material 108 can be between about 6 mm to about 50.8 mm thick surrounding each well casing 105 in all directions, although each well cavity opening is removably shielded by lids 201 as discussed below.

In some embodiments, a lower portion 111 of the shield casing 109 positioned below the bottom of the well casing 105 can have a smaller cross-sectional area than the upper portions of the shield casing 109. This configuration takes advantage of the well casing geometry to reduce the weight and amount of radiation shielding material 108 used while maintaining the minimum desired shielding thickness relative to the well casings 105 in all dimensions. However, in some embodiments the shield casing 109 may instead have a consistent cross-sectional area throughout a depth thereof and/or the lower portion 111 may increase in cross-sectional area. More generally, the shield casing 109 may have any suitable shape, whether of constant or varying geometry throughout its depth, for defining the shielding cavity 107 surrounding one or more of the well casings 105. The shielding casing 109 can be constructed from, for example, stainless steel, aluminum, tungsten, other metals, composites, plastics, combinations thereof, or any other suitable material.

Figure 1G:
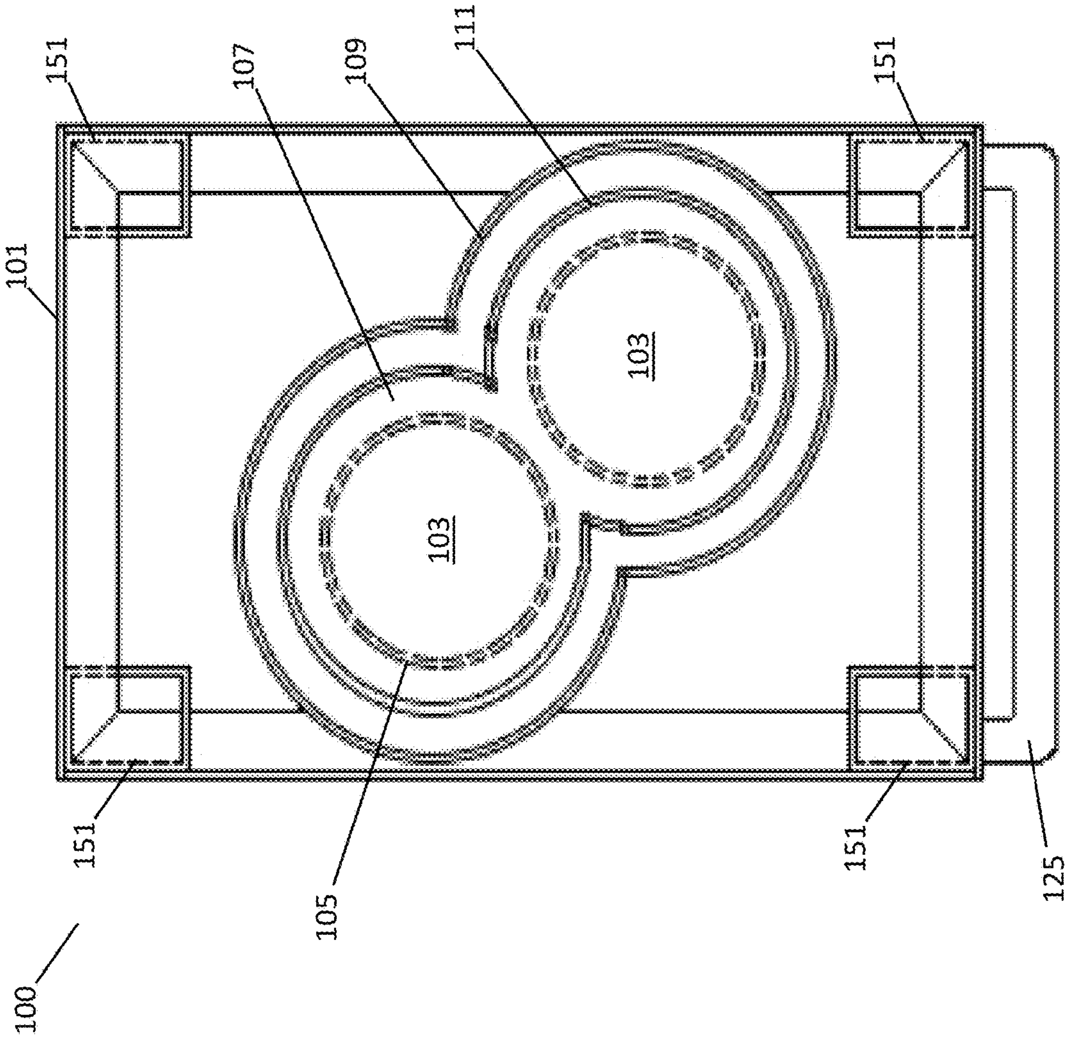
FIG. 1G illustrates a top cross-section of the shielded radioactive storage device of FIG. 1A.
Figure 1H:
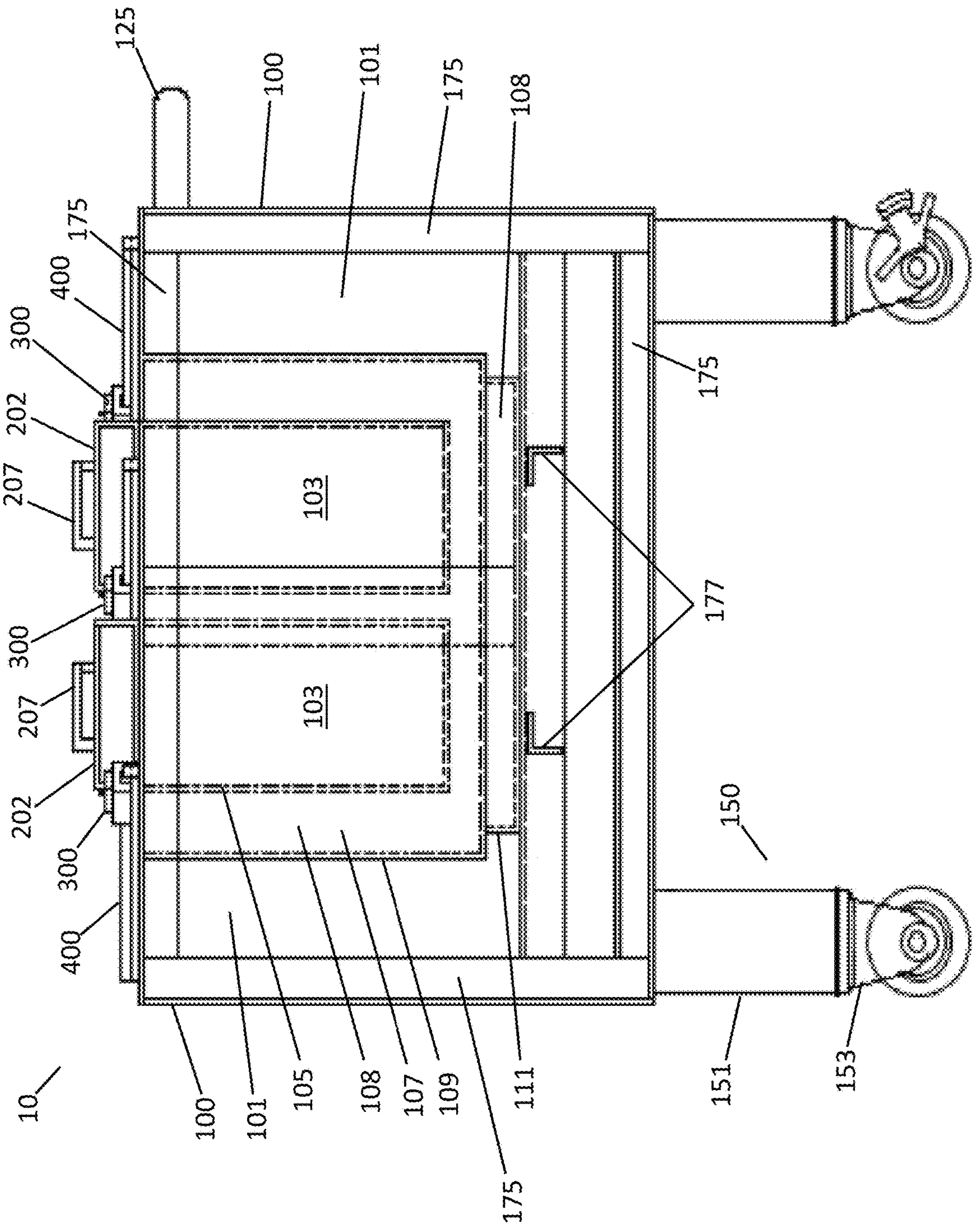
FIG. 1H illustrates a left cross-section of the shielded radioactive storage device of FIG. 1A.
Figure 1I:
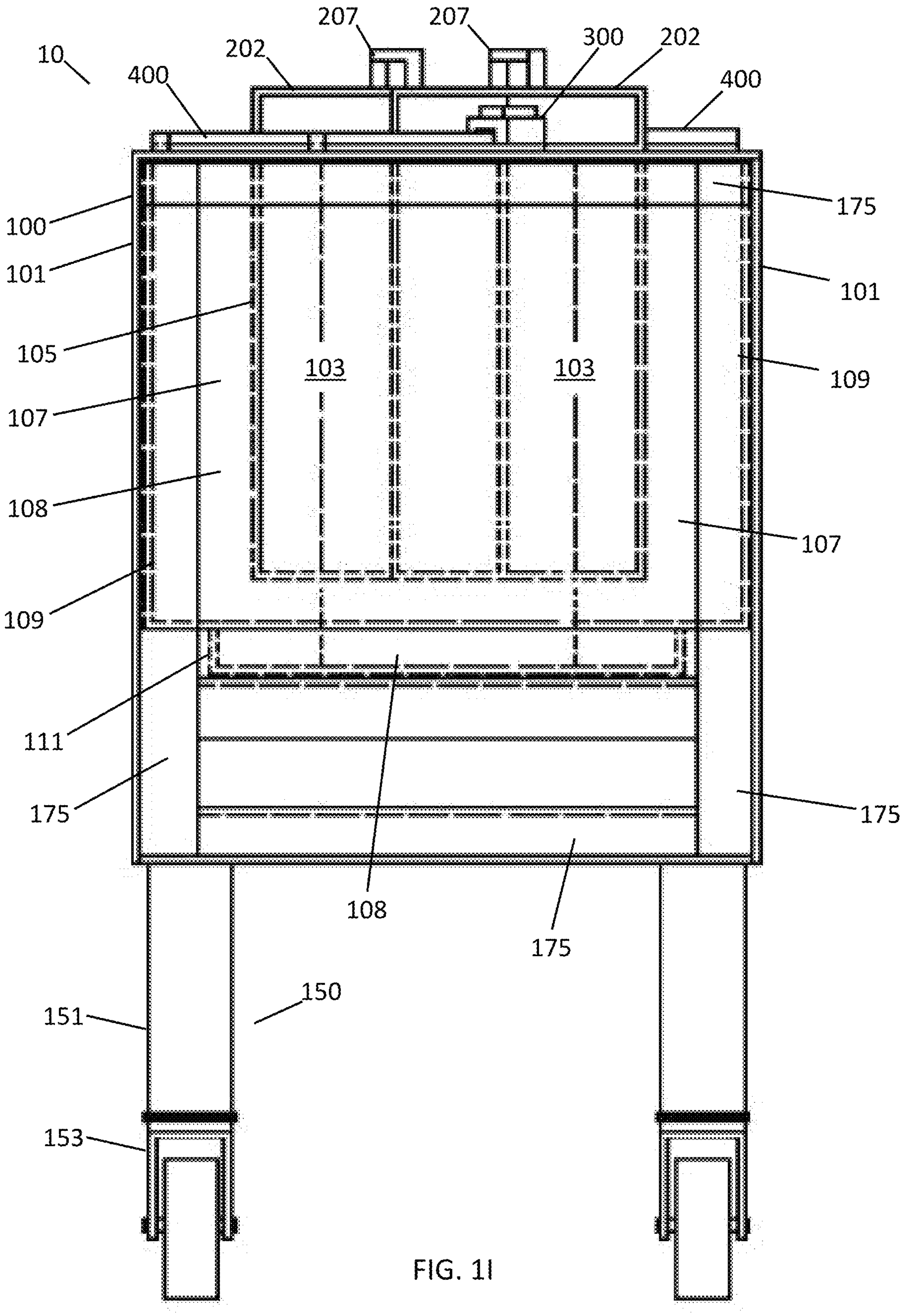
FIG. 1I illustrates a front cross-section of the shielded radioactive storage device of FIG. 1A.

In the exemplary embodiment illustrated in FIGS. 1A-1I, a dual well configuration is used having two adjacently positioned first and second well casings 105 forming adjacent first and second well cavities 103. As best shown in FIG. 1G, this dual well configuration permits the first and second well cavities 103 and their corresponding first and second well casings 105 to share shielding material 108 along adjacent portions thereof within a single shielding cavity 107. Thus, this dual well configuration advantageously uses a reduced amount of shielding material 108 along those adjacent portions (a single shielding thickness shared by both wells, rather than two separate shielding segments each having the same thickness), thereby reducing space/size, weight, material usage, and construction costs. Thus, the shielded radioactive storage device 10 is lighter and less expensive than conventional solutions. For example, in some embodiments this dual-well configuration can provide a reduction in shielding material of about 10% to about 25%, or about 15% to about 20%, thereby saving approximately 15% to 20% of total weight of the device 10. Furthermore, by saving space and reducing the size of the storage device 10, overall storage capacity within radiopharmaceutical facilities is increased. This can be a critical advantage in such facilities, which are typically cramped and space limited.

In some embodiments, an upper end of the shield casing 109 can preferably be attached to the upper wall of the hollow body 100, which, in combination with attachment of the well casing 105 to the upper wall of the hollow body 100, seals the radiation shielding material 108 within in the shielding cavity 107 and within the interior cavity of the hollow body 100, thereby preventing environmental lead contamination. For stability and structural integrity, in some embodiments, the shield casing 109 can be affixed in one or more locations to one or more side walls of the hollow body 100.

The shield casing 109 (including the lower portion 111) can be supported at the bottom by one or more support members 177 extending through the interior cavity. In some embodiments, the support members 177 can extend between and be affixed to and/or integrated with any one or more of a bottom wall of the hollow body 100, side walls of the hollow body 100, structural members 175, or combinations thereof. In some embodiments, the support members 177 can extend along and in contact with the bottom wall of the hollow body 100. In some embodiments, the support members 177 can be suspended above the bottom wall of the hollow body 100. The support members 177 can be constructed from any material capable of withstanding the weight of the shielding casing 107, shielding material 108, well casing 105, and radioactive payload without structural failure. The support members 177 can be of any suitable type, including, for example, rods, beams, brackets, bar stock, tubing, or combinations thereof.

In practice, the support members 177 can provide structural support to the shielded radioactive storage device 10 while also, where appropriate, supporting the shield casing 109 above the bottom wall of the hollow body 100. In this manner, the support members 177 can be located at whichever vertical position is appropriate for positioning the correctly sized shielding cavity 107, thereby avoiding a need for unnecessarily increasing a volume of the shielding cavity 107, which, in turn, reduces weight and material costs.

Still referring to FIGS. 1A-1I, in some embodiments, the shielded radioactive storage device 10 can be configured solely as a storage container wherein the hollow body 100 simply rests on the ground or some other surface. However, in some embodiments, the shielded radioactive storage device 10 can be configured as a table or a wheeled cart (e.g., as shown herein). For a table configuration, the shielded radioactive storage device 10 can include one or more legs extending from the bottom wall of the hollow body 100.

For a cart configuration, as shown in FIGS. 1A-1I, the shielded radioactive storage device 10 can include one or more leg assemblies 150 extending from the bottom wall of the hollow body 100, wherein each leg assembly includes a leg 151 having a caster 153 or other wheeled or movable element at an end thereof for facilitating movement of the shielded radioactive storage device 10. Such casters 153 can be fixed, steerable/swivelable, lockable, non-lockable or combinations thereof. As shown in FIG. 1G, in some embodiments, the legs 151 can further extend into and along a wall of the interior cavity 101 of the hollow body 100, thereby doubling as structural members 175.

In some embodiments, the shielded radioactive storage device 10 can also include a handle 125 attached to a wall of the hollow body 100 and/or one or more of the structural members 175 to facilitate easier movement and steering of the cart. In some embodiments, where storage space is limited, the handle 125 can be removable and/or the shielded radioactive storage device 10 may not include the handle.

Figure 2A:
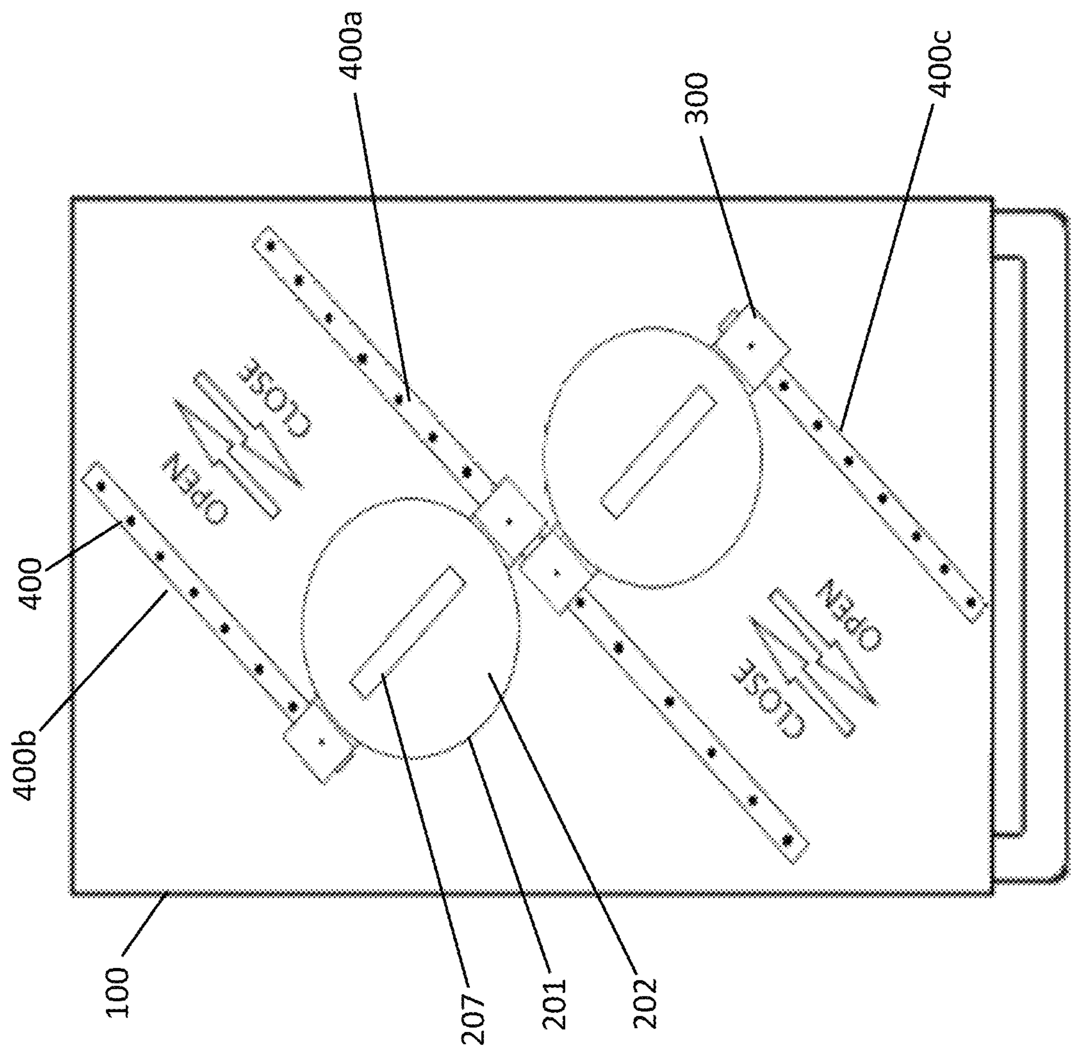
FIG. 2A illustrates a top view of a lid sliding system of a shielded radioactive storage device in accordance with various embodiments.
Figure 2B:
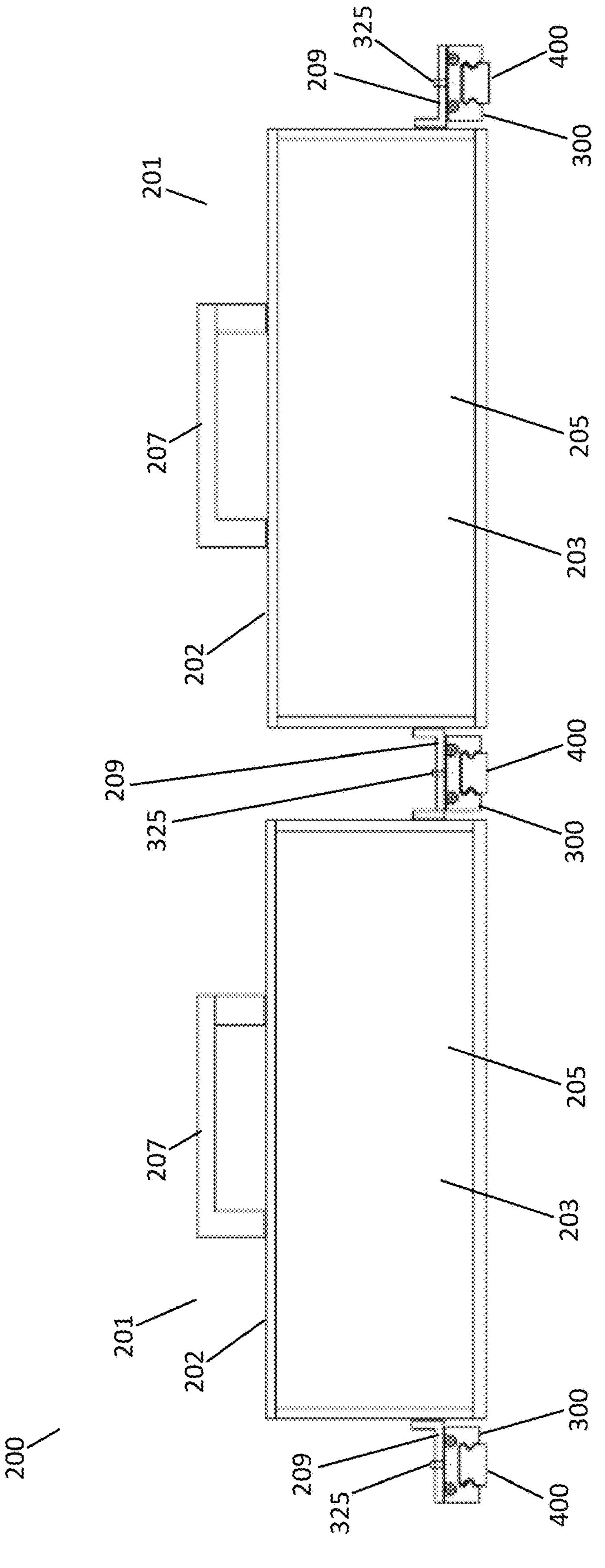
FIG. 2B illustrates a side cross-section of the lid sliding system of FIG. 2A.
Figure 2C:
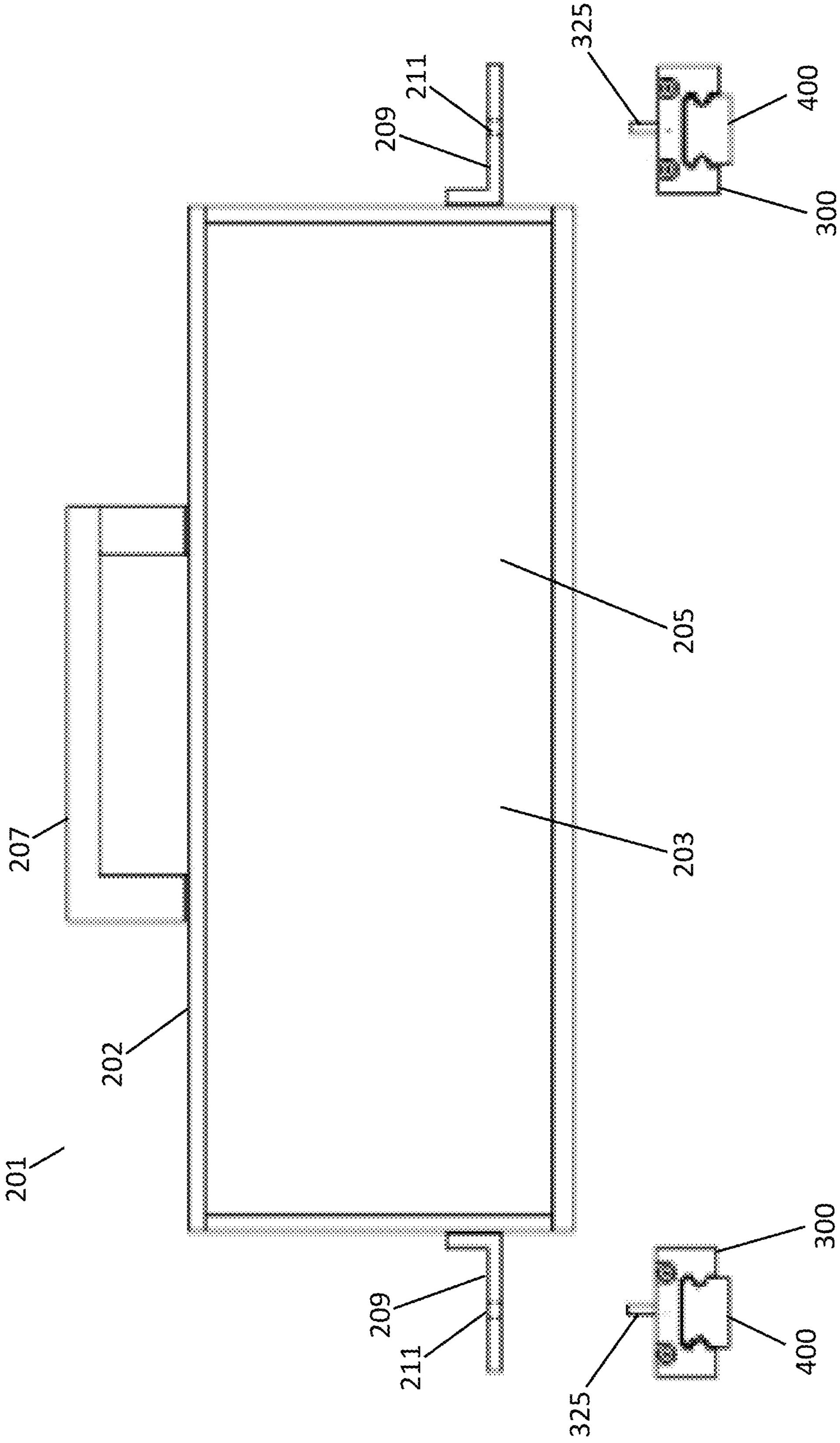
FIG. 2C illustrates a disassembled side cross-section of the lid sliding system of FIG. 2A.

As noted above, the openings of the well cavity 103 are removably shielded by lids 201 to permit insertion, extraction, and/or use of the radioactive payload being stored in the respective well cavity 103. Referring now to FIGS. 2A-2C, lids 201 are sized and shaped to at least cover the openings of the well cavity 103 and, preferably, to be larger than the well cavity opening to overlap the upper wall of the hollow body 100. The lids 201 include a sealed lid casing 202 defining a lid cavity 203, wherein the lid cavity 203 is at least partially filled with lid shielding material 205. The thickness of the radiation shielding material 205 can be configured to have any suitable thickness depending on the type and size of a radioactive payload to be stored in the well cavities 103. Types and thicknesses of radiation shielding material 205 for common radiopharmaceutical isotopes are shown in FIG. 5. Types and thicknesses of radiation shielding material 205 for common radiopharmaceutical isotopes are shown in FIG. 5 and, in some embodiments, the lid shielding cavity 203 can be sized to accommodate radiation shielding material 205 matching or exceeding any one or more such thicknesses. In some embodiments, the radiation shielding material 205 can be between about 6 mm to about 50.8 mm thick covering the opening of the well cavity 103. In some embodiments, to facilitate carrying and lifting of the lid 201, the lid 201 can also include a handle 207 extending from the lid casing 202 opposite the well cavity 103.

The lid casing 202 can be constructed from any suitable material including, for example, stainless steel, aluminum, tungsten, other metals, composites, plastics, combinations thereof, or any other suitable material. The lid shielding material 205 can be any suitable and effective radiation shielding material 205 such as lead, tungsten, high density concrete, borated polyethylene, metal impregnated polymers, aluminum, or any other suitable materials.

In some embodiments, a lid sliding system 200 can be included to aid in opening and closing the well cavities 103 during insertion, extraction, and use of the radioactive payloads. As best shown in FIGS. 2A-2C, the lid sliding system 200 can include two or more rails 400 attached to the upper wall of the hollow body 100 and two or more carriage assemblies 300 each configured to slide on a corresponding one of the rails 400. Each of the lids 201 includes opposing mounting brackets 209 extending outward from the lid casing 202 and having a mounting hole 211 defined therein for engaging a pin 325 of the carriage assembly 300. The mounting hole 211 can generally extend partially or completely through the mounting bracket 209 so long as the mounting hole 211 is of sufficient depth that the mounting bracket 209 rests on an upper surface of the carriage assembly 300 when the pin 325 is received in the mounting hole 211. In addition, the mounting hole can be a simple cylindrical through-hole (e.g., as in FIGS. 2B-2C) or can have any other cross-sectional shape (e.g., conical as in FIGS. 7B-7C) suitable for receiving the pin 325.

As discussed above with reference to FIGS. 1A-1I, a dual well configuration has several advantages with respect to weight, space savings, material usage, and cost. In addition, this configuration, particularly where the first and second well cavities 103 and well casings 105 are oriented at an angle to the hollow body 100, also provides the lid sliding system 200 with a configuration permitting simultaneous, independent opening and closure of the first and second lids 201.

As shown in FIGS. 2A-2C, a center rail **400*a* extends along the upper wall of the hollow body 100 between first and second wells and their corresponding lids 201. A first outer rail 400*b* extends parallel to the center rail 400*a* along or tangent to a side of the first well opposite the center rail 400*a*. A second outer rail 400*c* extends parallel to the center rail 400*a* along or tangent to a side of the second well opposite the center rail 400*a***.

The first outer rail **400*b* extends in a first direction toward a first side wall of the hollow body 100 and includes a carriage assembly 300 mounted thereto and configured to slide along the first outer rail 400*b* in the first direction. The second outer rail 400*c* extends in a second direction, opposite the first direction, toward an opposing side wall of the hollow body 100 and includes a carriage assembly 300 mounted thereto and configured to slide along the second outer rail 400*c* in the second direction. The center rail 400*a* extends in both the first and second directions, parallel to each of the first and second outer rails 400*b*, 400*c*, and includes two carriage assemblies 300 mounted thereto, wherein one of the center rail carriage assemblies 300** is configured to travel in the first direction and the other is configured to travel in the second direction.

Each of the carriage assemblies 300 includes at least one pin 325 for engagement with the mounting hole 211 of a corresponding one of the mounting brackets 209 to permit removable engagement with the corresponding lid 201. Thus, as shown in FIG. 2A, in use, the lid sliding system 200 permits simultaneous, independent sliding of each of the first and second lids 201 between a closed position covering the corresponding well, and an open position wherein the corresponding well is uncovered to permit insertion, removal, and/or use of the radioactive payload. Furthermore, because the lids move in opposing directions, the simultaneous operation can be achieved without obstruction of or interference with either well 103, permitting well cleaning, radioactive payload use, payload insertion, payload removal, or combinations thereof.

Figure 3A:
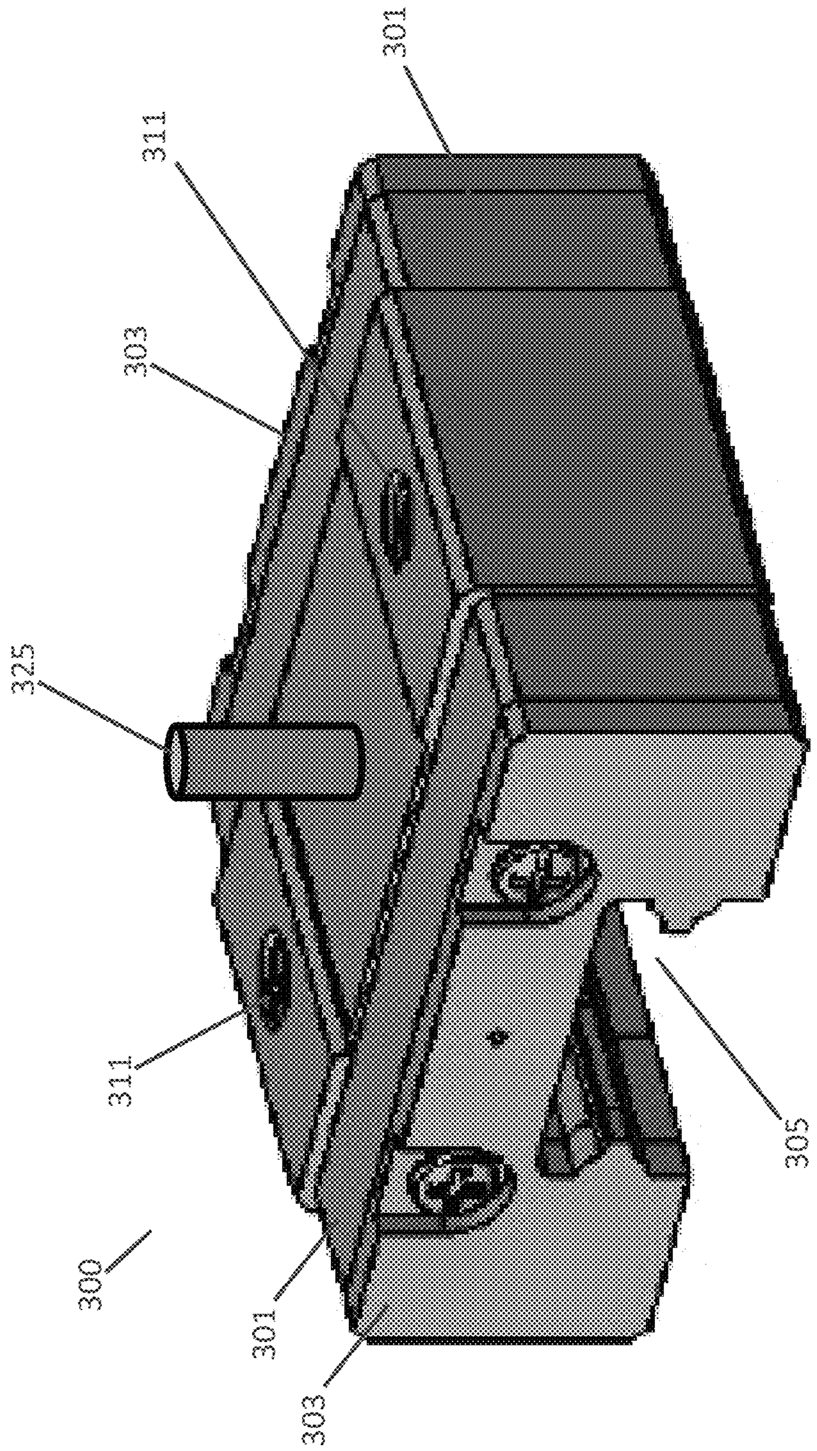
FIG. 3A illustrates an upper perspective of a carriage assembly in accordance with various embodiments.
Figure 3B:
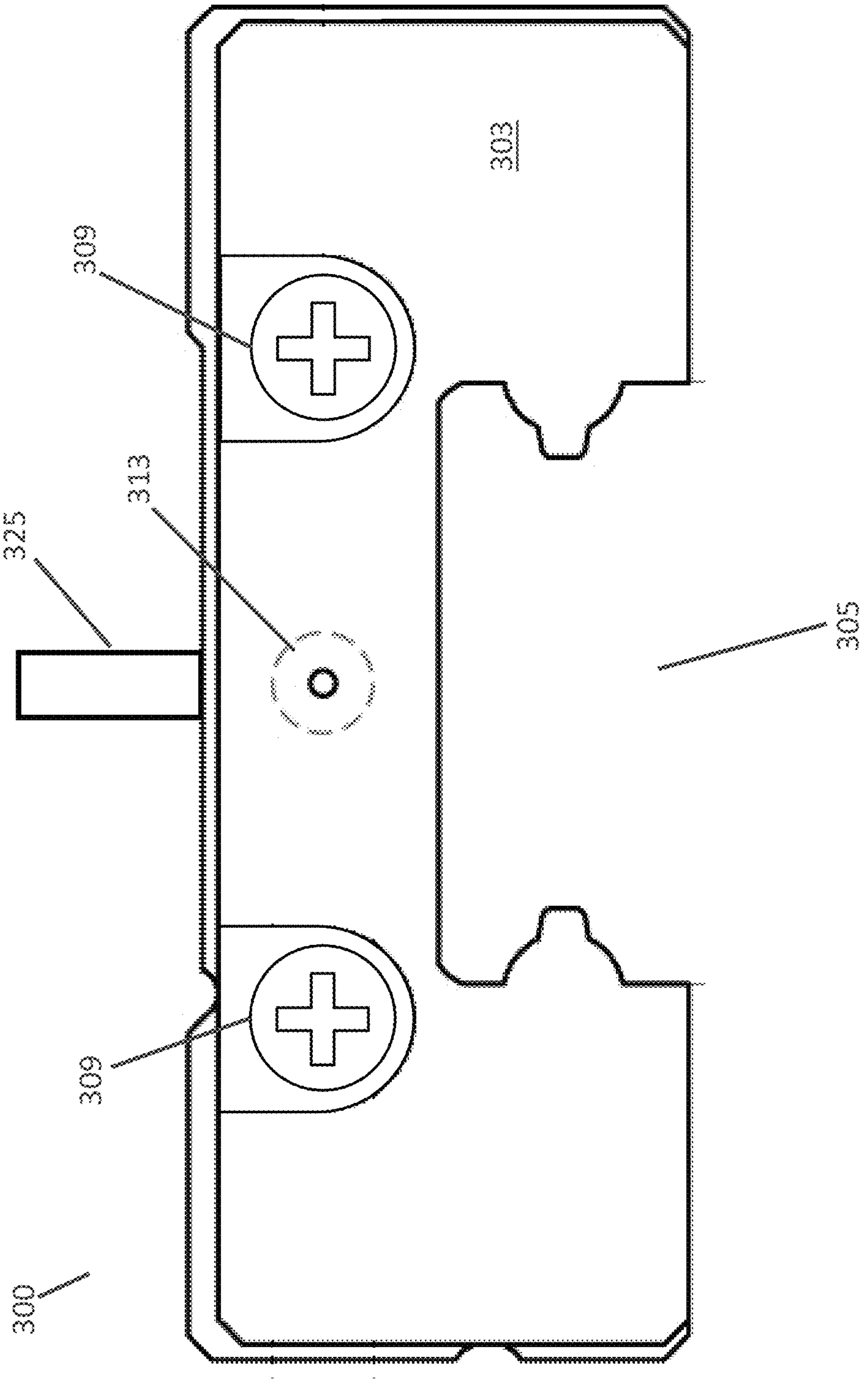
FIG. 3B illustrates a front view of the carriage assembly of FIG. 3A.
Figure 3C:
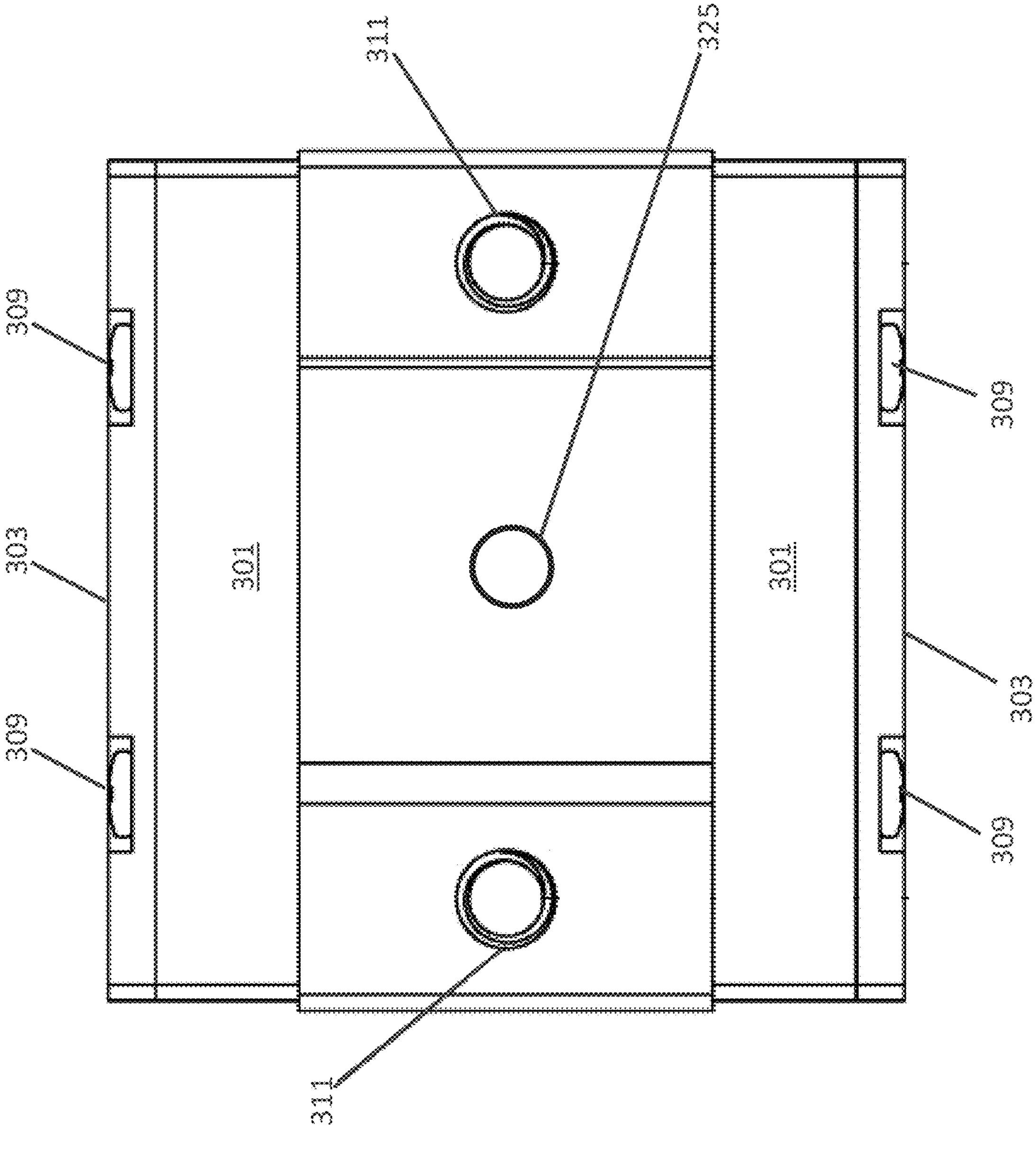
FIG. 3C illustrates a top view of the carriage assembly of FIG. 3A.

As shown in FIGS. 3A-3C, the carriage assembly 300 includes a housing 301 having a rail slot 305 sized and shaped to slidably engage with the rails 400 and the pin 325 extending from the housing opposite the rail slot. In the exemplary embodiment shown in FIGS. 3A-3C, the carriage assembly 300 is a bearing carriage having front and back covers 303 for accessing bearings (not shown) within the housing 301. The covers 303 can be fastened to the housing 301 by any means, although preferably a removable fastener such as screws/bolts 309 as shown. In some embodiments, the carriage assembly can also include bearing tension adjustments 311 for controlling how freely the carriage assembly can slide along the rails 400. In some embodiments, the housing 301 can also include a lubricant input port 313 for lubricating the bearings as needed.

Figure 4A:
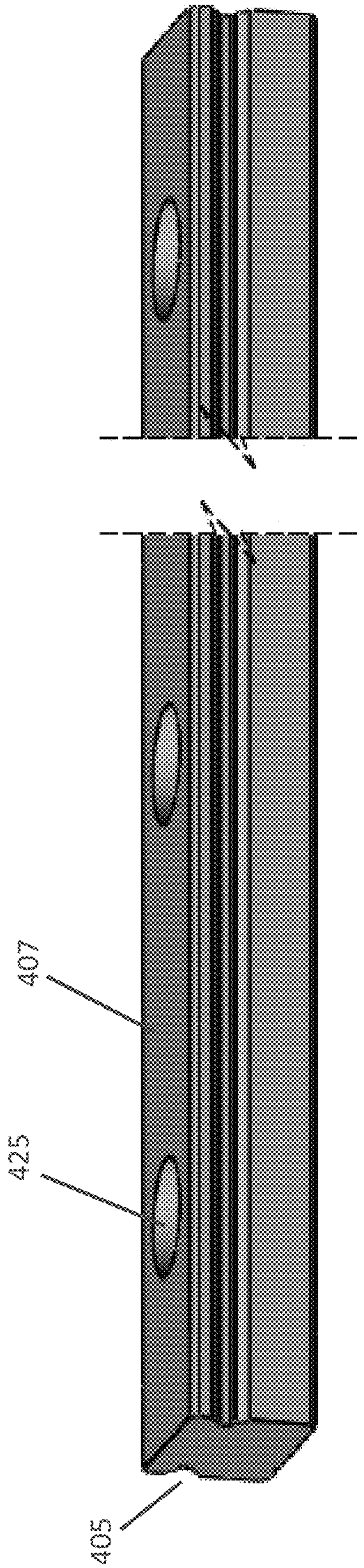
FIG. 4A illustrates an upper side perspective of a rail in accordance with various embodiments.
Figure 4B:
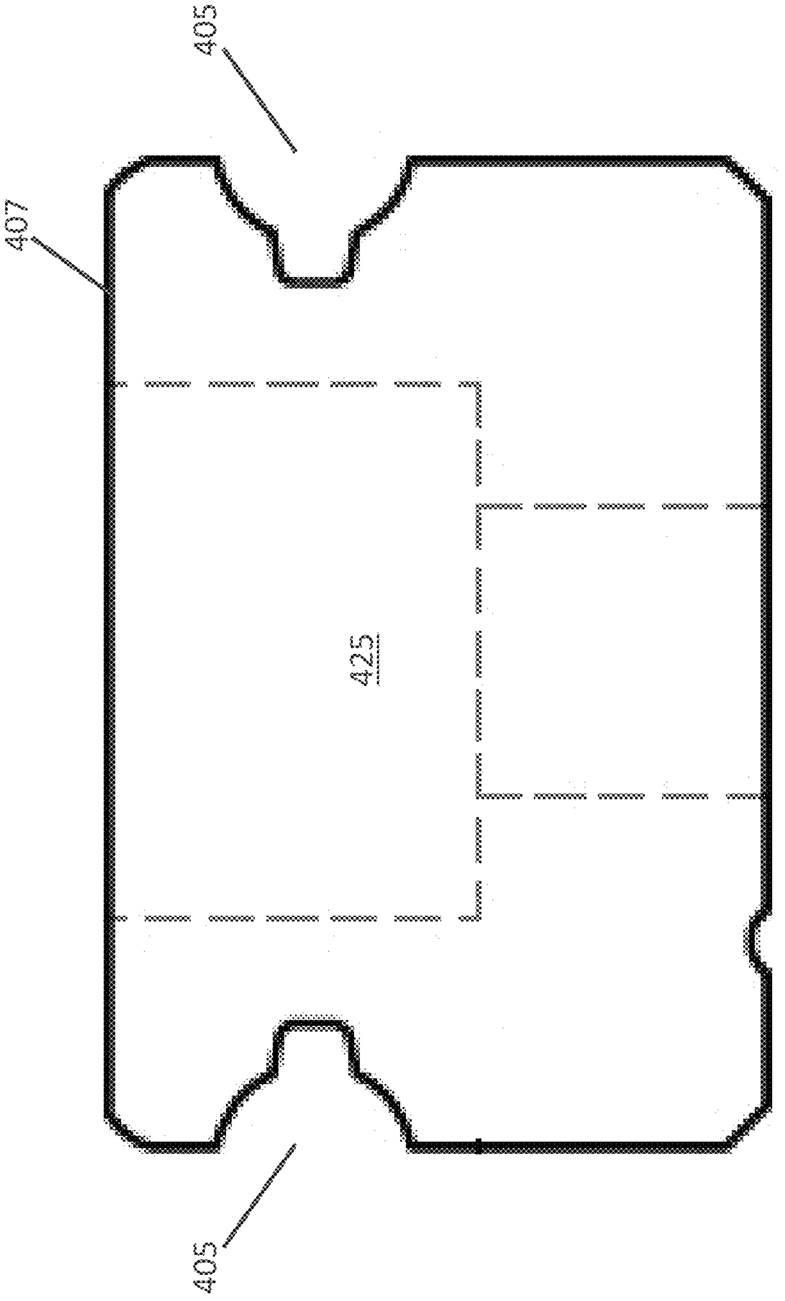
FIG. 4B illustrates a cross-section of the rail of FIG. 4A.

As shown in FIGS. 4A and 4B, the rails 400 can include grooves 405 and a bearing surface 407 for slidably engaging and retaining the rail slot 305 of the carriage assembly 300 thereon. The rails 400 also include a plurality of countersunk holes 425 for permitting attachment to the upper wall of the hollow body via, for example, bolting and/or welding. As shown in FIGS. In some embodiments, the lid sliding system 200 can include one or more stop mechanisms (not shown) along or on any of the rails 400, rail carriages 300, mounting brackets 209, and/or lids 201 to retain the corresponding lid in at least one of the closed position and/or the open position.

Generator Cart Having Locking Lid System and Removable Handle

Referring now to FIGS. 6A-6I, in some embodiments a shielded radioactive storage device 60 includes a hollow body 600 having an interior cavity 601. The hollow body 600 can preferably be an enclosed body constructed from, for example, stainless steel, aluminum, tungsten, other metals, composites, plastics, combinations thereof, or any other suitable material. The hollow body 600, although shown as having a rectangular prism or box shape, can take any other suitable shape including, for example, an egg shape, a cylindrical shape, an elliptical prism, or any other suitable shape. In some embodiments, the hollow body can also include a structural frame integrated with and/or attached thereto including one or more structural members 675 (e.g., top, bottom, and side corner angle irons 675 as shown) to better support the weight of heavy radiation shielding material 608. The structural members 675 can be constructed from any material capable of withstanding the weight of the shielded radioactive storage device 60 without structural failure.

Within the hollow body 600, the storage device 60 includes one or more well casings 605 (e.g., two as shown) positioned in the interior cavity 601, each well casing 605 having a closed bottom and at least one side. The well casing 605 forms a well cavity 603 having an opening defined as an aperture in an upper surface of the hollow body 600, to which the open end of the well casing 605 is attached. The well cavity 603 and opening can be sized and shaped to receive and accommodate a relevant radioactive payload or payloads. For example, in some embodiments, each of the well cavity openings can be one or more of circular, square, rectangular, rhombic, pentagonal, hexagonal, pentangular, star-shaped, polygonal, triangular, or combinations thereof and similarly, each well cavity 603 and corresponding well casing 605 can have any suitable shape, whether having a constant or variable cross-sectional geometry throughout a depth thereof. The well casing 605 can be constructed from, for example, stainless steel, aluminum, tungsten, other metals, composites, plastics, combinations thereof, or any other suitable material.

A shield casing 609 is positioned in the interior cavity 601 of the hollow body 600, the shield casing 609 having a closed bottom and at least one side such that the shield casing 609 extends around and is spaced apart from one or more of the well casings 605 to form a shielding cavity 607 therebetween. In some embodiments, a lower portion 611 of the shield casing 609 positioned below the bottom of the well casing 605 can have a smaller cross-sectional area than the upper portions of the shield casing 609. This configuration takes advantage of the well casing geometry to minimize the size of the shielding cavity 607, thereby minimizing the required amount and weight of radiation shielding material 608 used while maintaining a minimum desired shielding thickness relative to the well casings 605 in all dimensions. However, in some embodiments the shield casing 609 may instead have a consistent cross-sectional area throughout a depth thereof and/or the lower portion 611 may increase in cross-sectional area. More generally, the shield casing 609 may have any suitable shape, whether of constant or varying geometry throughout its depth, for defining the shielding cavity 607 surrounding one or more of the well casings 605. The shielding casing 609 can be constructed from, for example, stainless steel, aluminum, tungsten, other metals, composites, plastics, combinations thereof, or any other suitable material.

Depending on the intended application, the shielding cavity 607 can be filled with any suitable and effective radiation shielding material 608 such as lead, tungsten, high density concrete, borated polyethylene, metal impregnated polymers, aluminum, or any other suitable materials. The thickness of the radiation shielding material 608 can be configured with any suitable thickness depending on the type and size of a radioactive payload to be stored in the well cavities 603. Types and thicknesses of radiation shielding material 608 for common radiopharmaceutical isotopes are shown in FIG. 5 and, in some embodiments, the shielding cavity 607 can be sized to accommodate radiation shielding material 608 matching or exceeding any one or more such thicknesses. In some embodiments, the radiation shielding material 608 can be between about 6 mm to about 50.8 mm thick surrounding each well casing 605 in all directions, although each well cavity opening is removably shielded by lids 701 as discussed below.

In some embodiments, a lower portion 611 of the shield casing 609 positioned below the bottom of the well casing 605 can have a smaller cross-sectional area than the upper portions of the shield casing 609. This configuration takes advantage of the well casing geometry to reduce the weight and amount of radiation shielding material 608 used while maintaining the minimum desired shielding thickness relative to the well casings 605 in all dimensions. However, in some embodiments the shield casing 609 may instead have a consistent cross-sectional area throughout a depth thereof and/or the lower portion 611 may increase in cross-sectional area. More generally, the shield casing 609 may have any suitable shape, whether of constant or varying geometry throughout its depth, for defining the shielding cavity 607 surrounding one or more of the well casings 605. The shielding casing 609 can be constructed from, for example, stainless steel, aluminum, tungsten, other metals, composites, plastics, combinations thereof, or any other suitable material.

Figure 6B:
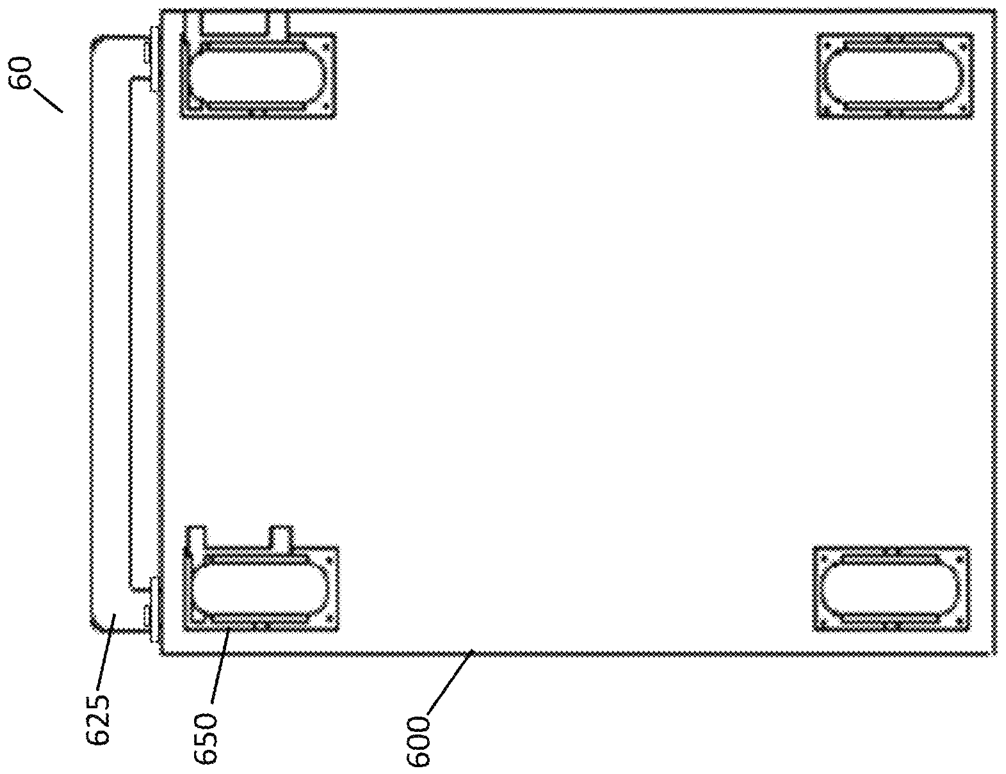
FIG. 6B illustrates a bottom view of the shielded radioactive storage device of FIG. 6A.
Figure 6A:
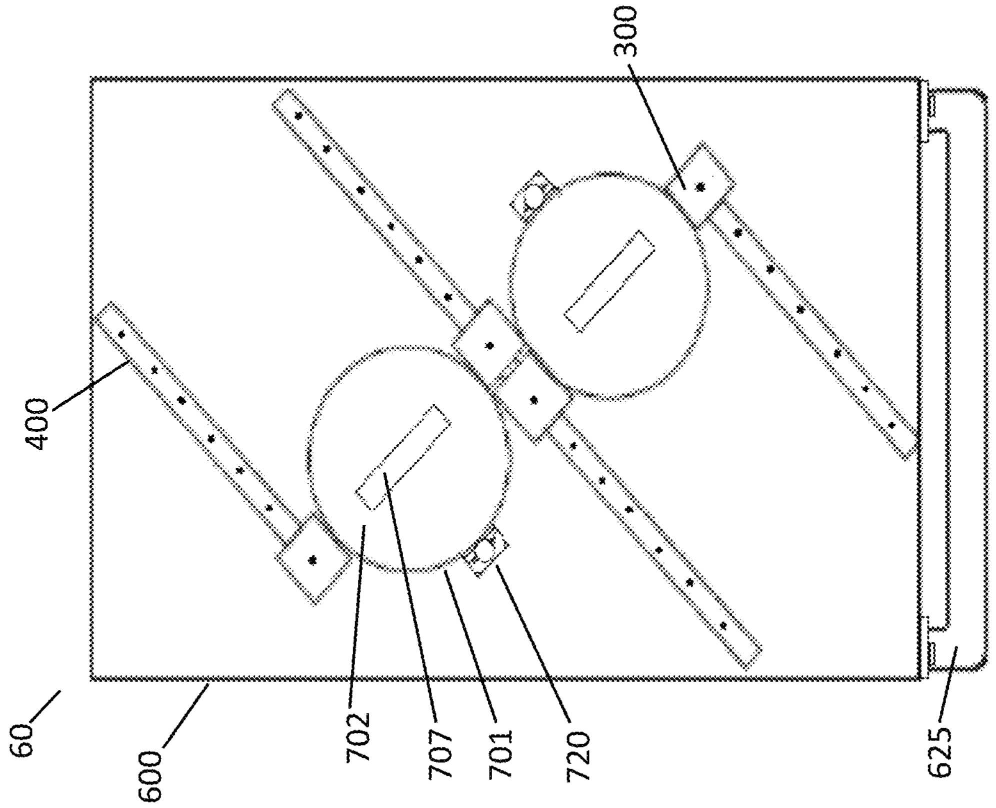
FIG. 6A illustrates a top view of a shielded radioactive storage device in accordance with various embodiments.
Figure 6D:
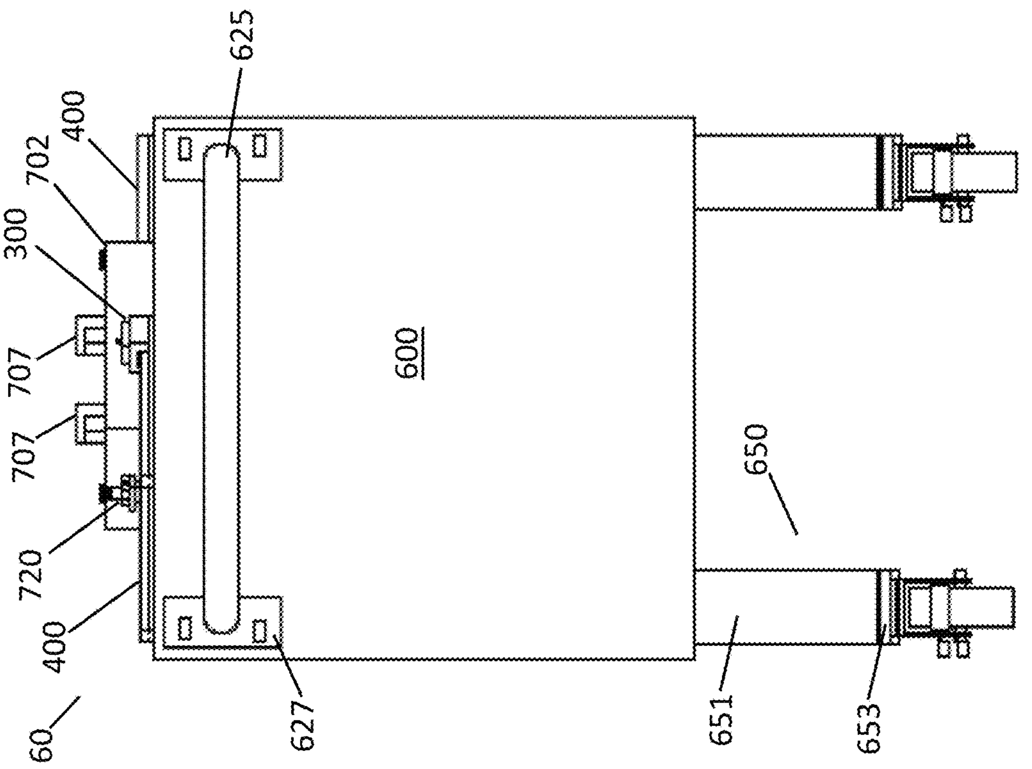
FIG. 6D illustrates a back view of the shielded radioactive storage device of FIG. 6A.
Figure 6C:
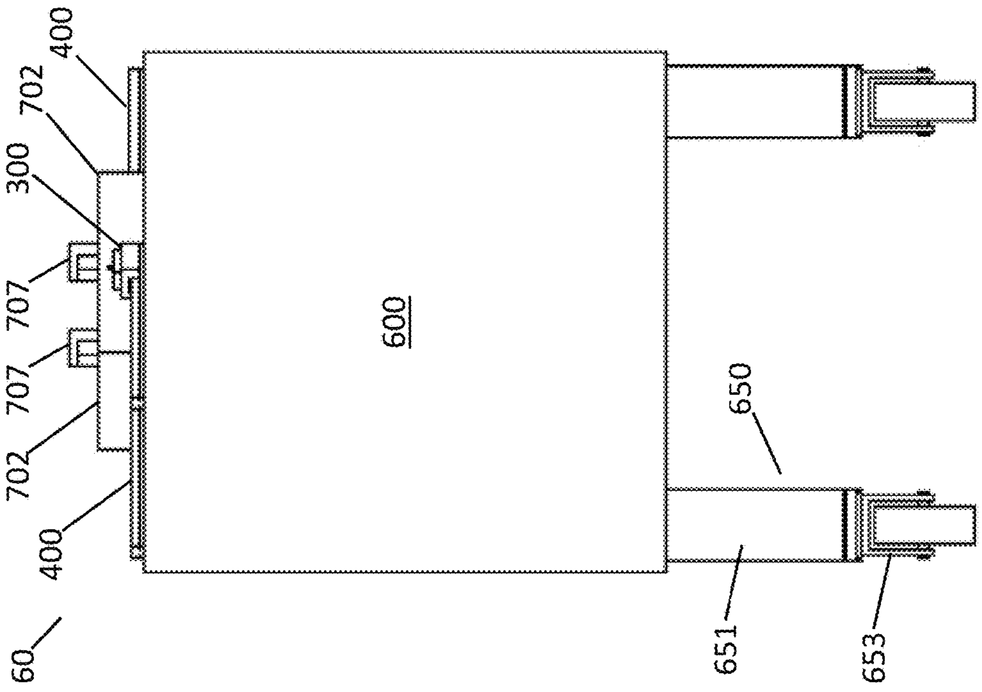
FIG. 6C illustrates a front view of the shielded radioactive storage device of FIG. 6A.
Figure 6F:
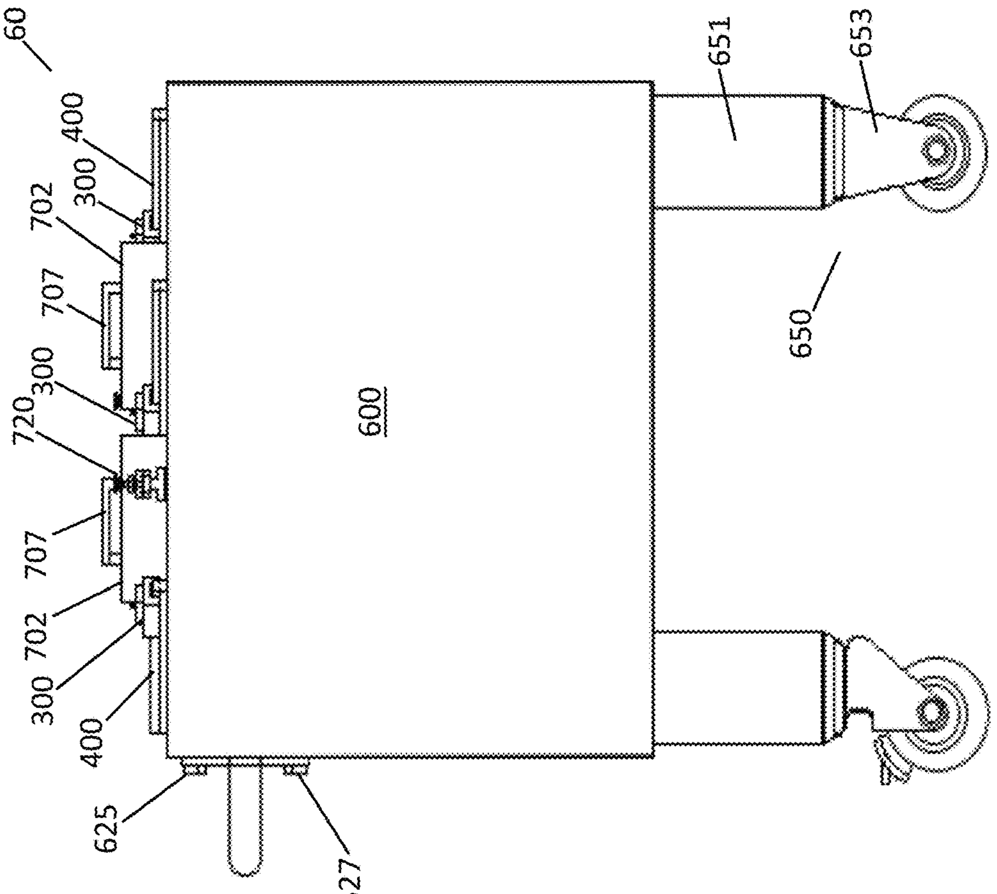
FIG. 6F illustrates a right view of the shielded radioactive storage device of FIG. 6A.
Figure 6E:
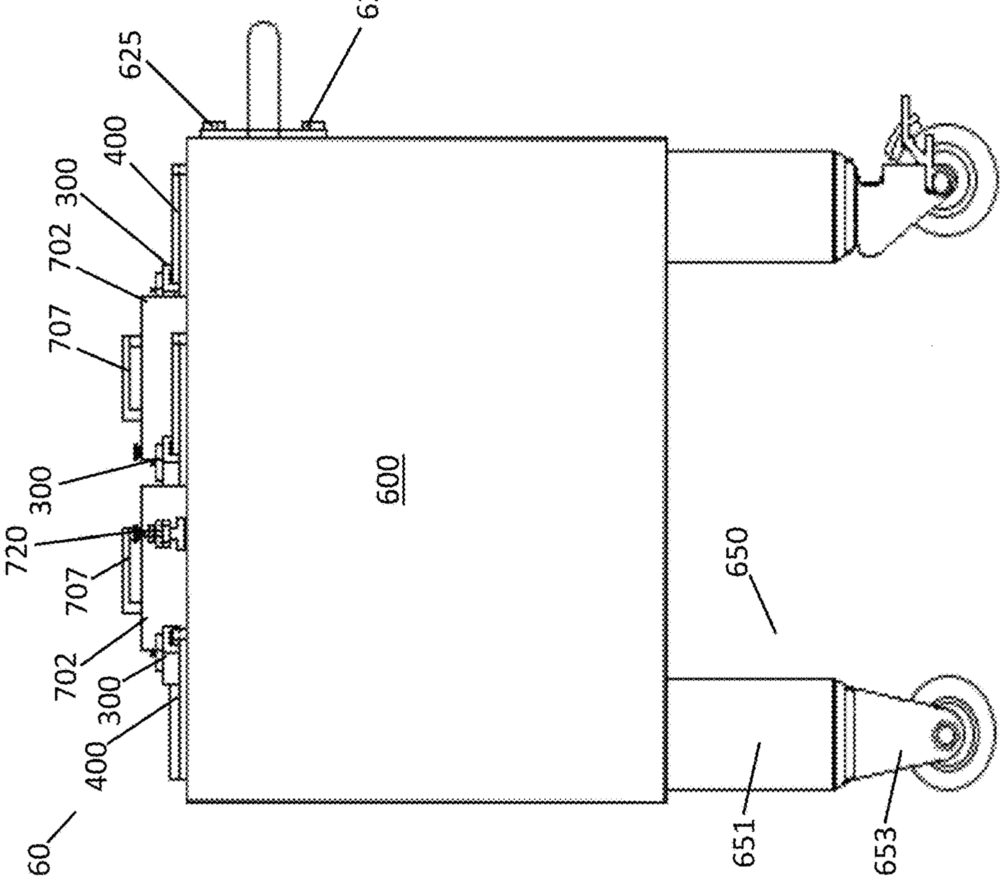
FIG. 6E illustrates a left view of the shielded radioactive storage device of FIG. 6A.
Figure 6G:
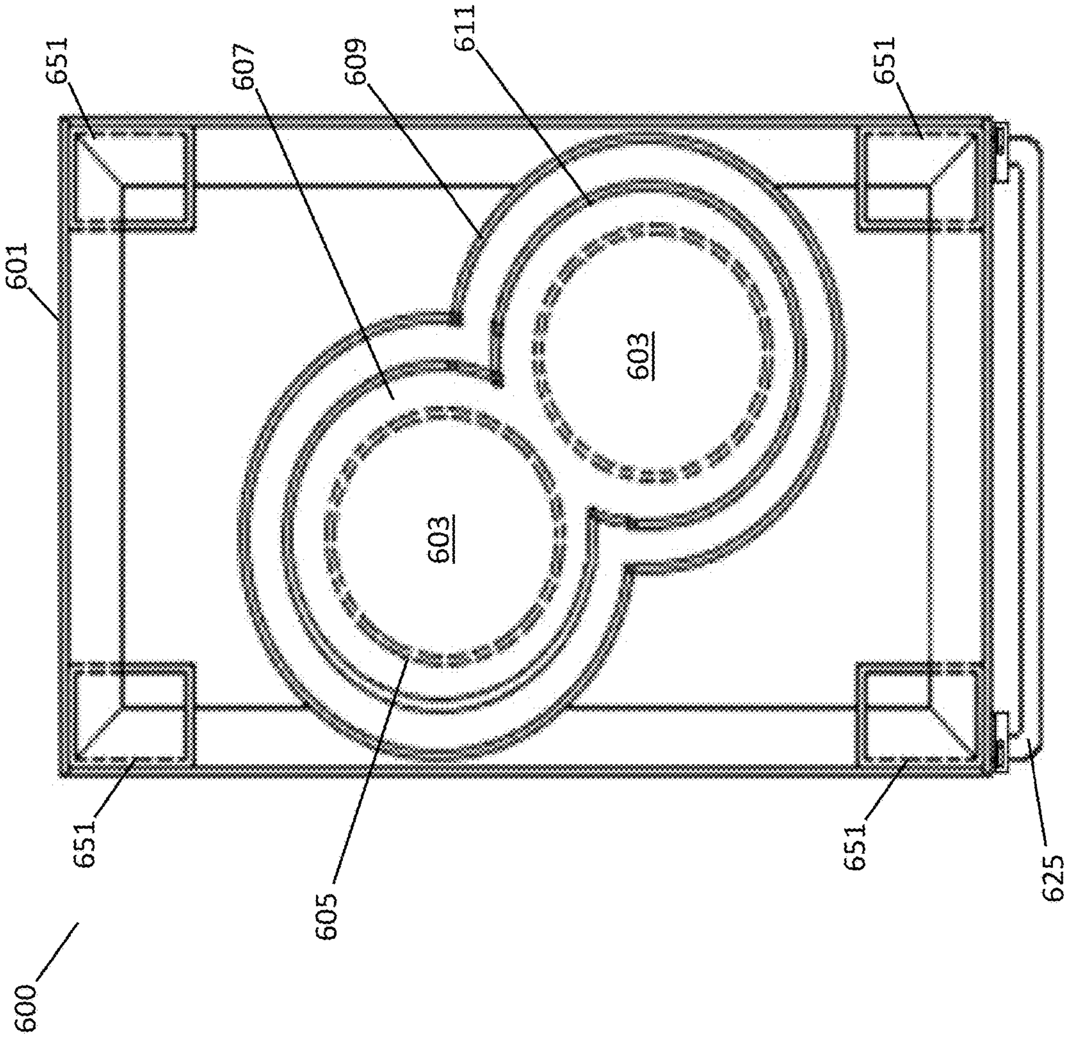
FIG. 6G illustrates a top cross-section of the shielded radioactive storage device of FIG. 6A.
Figure 6H:
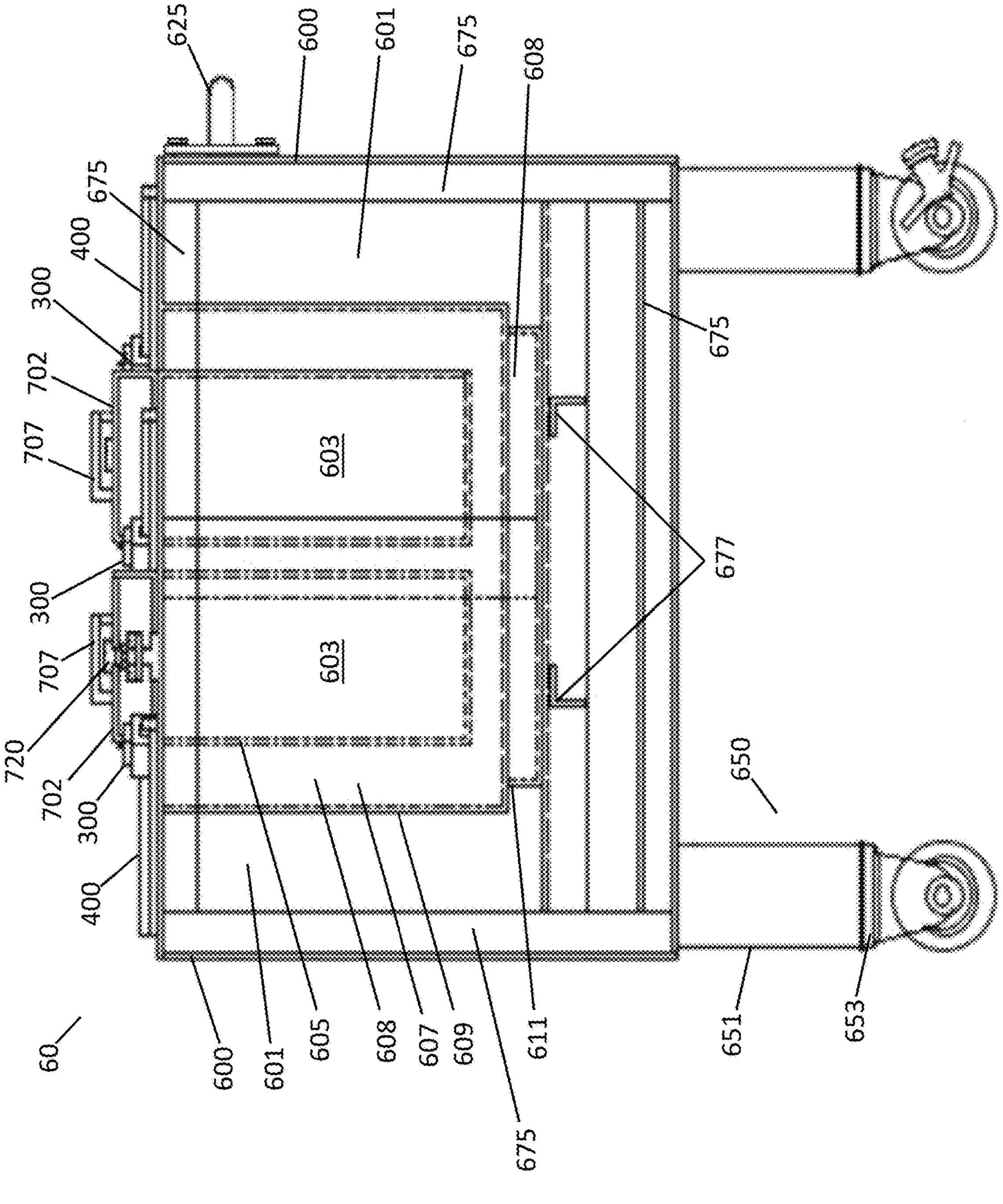
FIG. 6H illustrates a left cross-section of the shielded radioactive storage device of FIG. 6A.
Figure 6I:
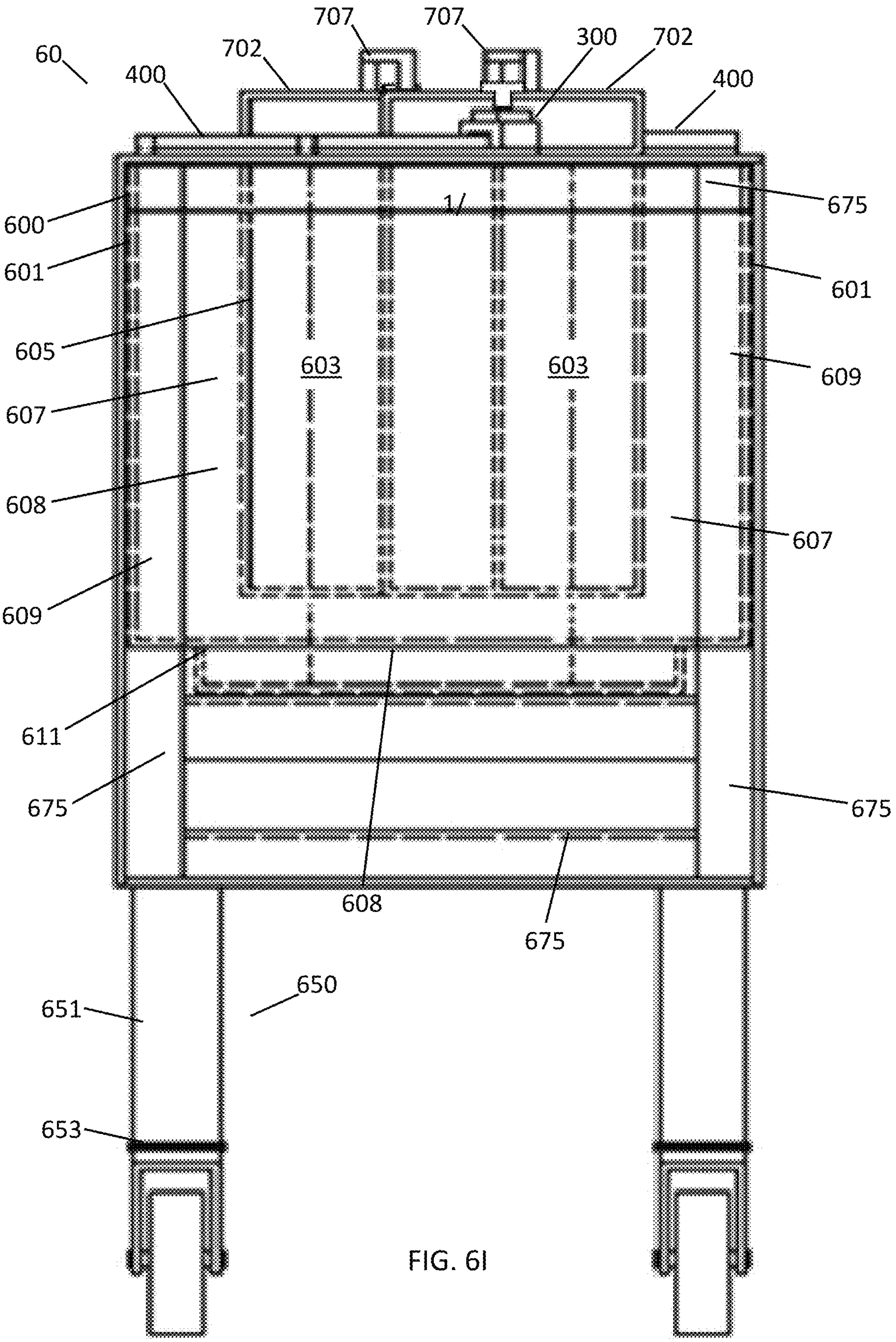
FIG. 6I illustrates a front cross-section of the shielded radioactive storage device of FIG. 6A.

In the exemplary embodiment illustrated in FIGS. 6A-6I, a dual well configuration is used having two adjacently positioned first and second well casings 605 forming adjacent first and second well cavities 603. As best shown in FIG. 6G, this dual well configuration permits the first and second well cavities 603 and their corresponding first and second well casings 605 to share shielding material 608 along adjacent portions thereof within a single shielding cavity 607. Thus, this dual well configuration advantageously uses a reduced amount of shielding material 608 along those adjacent portions (a single shielding thickness shared by both wells, rather than two separate shielding segments each having the same thickness), thereby reducing space/size, weight, material usage, and construction costs. Thus, the shielded radioactive storage device 60 is lighter and less expensive than conventional solutions. For example, in some embodiments this dual-well configuration can provide a reduction in shielding material 608 of about 10% to about 25%, or about 15% to about 20%, thereby saving approximately 15% to 20% of total weight of the device 60. Furthermore, by saving space and reducing the size of the storage device 60, overall storage capacity within radiopharmaceutical facilities is increased. This can be a critical advantage in such facilities, which are typically cramped and space limited.

In some embodiments, an upper end of the shield casing 609 can preferably be attached to the upper wall of the hollow body 600, which, in combination with attachment of the well casing 605 to the upper wall of the hollow body 600, seals the radiation shielding material 608 within in the shielding cavity 607 and within the interior cavity of the hollow body 600, thereby preventing environmental lead contamination. For stability and structural integrity, in some embodiments, the shield casing 609 can be affixed in one or more locations to one or more side walls of the hollow body 600.

The shield casing 609 (including the lower portion 611) can be supported at the bottom by one or more support members 677 extending through the interior cavity. In some embodiments, the support members 677 can extend between and be affixed to and/or integrated with any one or more of a bottom wall of the hollow body 600, side walls of the hollow body 600, structural members 675, or combinations thereof. In some embodiments, the support members 677 can extend along and in contact with the bottom wall of the hollow body 600. In some embodiments, the support members 677 can be suspended above the bottom wall of the hollow body 600. The support members 677 can be constructed from any material capable of withstanding the weight of the shielding casing 607, shielding material 608, well casing 605, and radioactive payload without structural failure. The support members 677 can be of any suitable type, including, for example, rods, beams, brackets, bar stock, tubing, or combinations thereof.

In practice, the support members 677 can provide structural support to the shielded radioactive storage device 60 while also, where appropriate, supporting the shield casing 609 above the bottom wall of the hollow body 600. In this manner, the support members 677 can be located at whichever vertical position is appropriate for positioning the correctly sized shielding cavity 607, thereby avoiding a need for unnecessarily increasing a volume of the shielding cavity 607, which, in turn, reduces weight and material costs.

Still referring to FIGS. 6A-6I, in some embodiments, the shielded radioactive storage device 60 can be configured solely as a storage container wherein the hollow body 600 simply rests on the ground or some other surface. However, in some embodiments, the shielded radioactive storage device 60 can be configured as a table or a wheeled cart (e.g., as shown herein). For a table configuration, the shielded radioactive storage device 60 can include one or more legs extending from the bottom wall of the hollow body 600.

For a cart configuration, as shown in FIGS. 6A-6I, the shielded radioactive storage device 60 can include one or more leg assemblies 650 extending from the bottom wall of the hollow body 600, wherein each leg assembly includes a leg 651 having a caster 653 or other wheeled or movable element at an end thereof for facilitating movement of the shielded radioactive storage device 60. Such casters 653 can be fixed, steerable/swivelable, lockable, non-lockable or combinations thereof. As shown in FIG. 6G, in some embodiments, the legs 651 can further extend into and along a wall of the interior cavity 601 of the hollow body 600, thereby doubling as structural members 675.

In some embodiments, the shielded radioactive storage device 60 can also include a removable and/or collapsible handle 625 attached to a wall of the hollow body 600 and/or one or more of the structural members 675 to facilitate easier movement and steering of the cart. Advantageously, the removable handle can provide for such ease of movement and steering and yet still occupy less floor space in facilities where storage space is limited. As best shown in FIGS. 6D-6F, such removable handles 625 can, for example, include be removably bolted, to the wall of the hollow body 600 of the shielded radioactive storage device 60 via bracket elements 627. Alternatively, in some embodiments (not shown), the handle 625 may be attachable via one or more pins, matable slots, a carriage rail, or any other suitable mechanism. In addition, in some embodiments the handle 625 may be hinged or otherwise foldable or collapsible with respect to the bracket elements 627 and/or the wall of the hollow body 600.

Figure 7A:
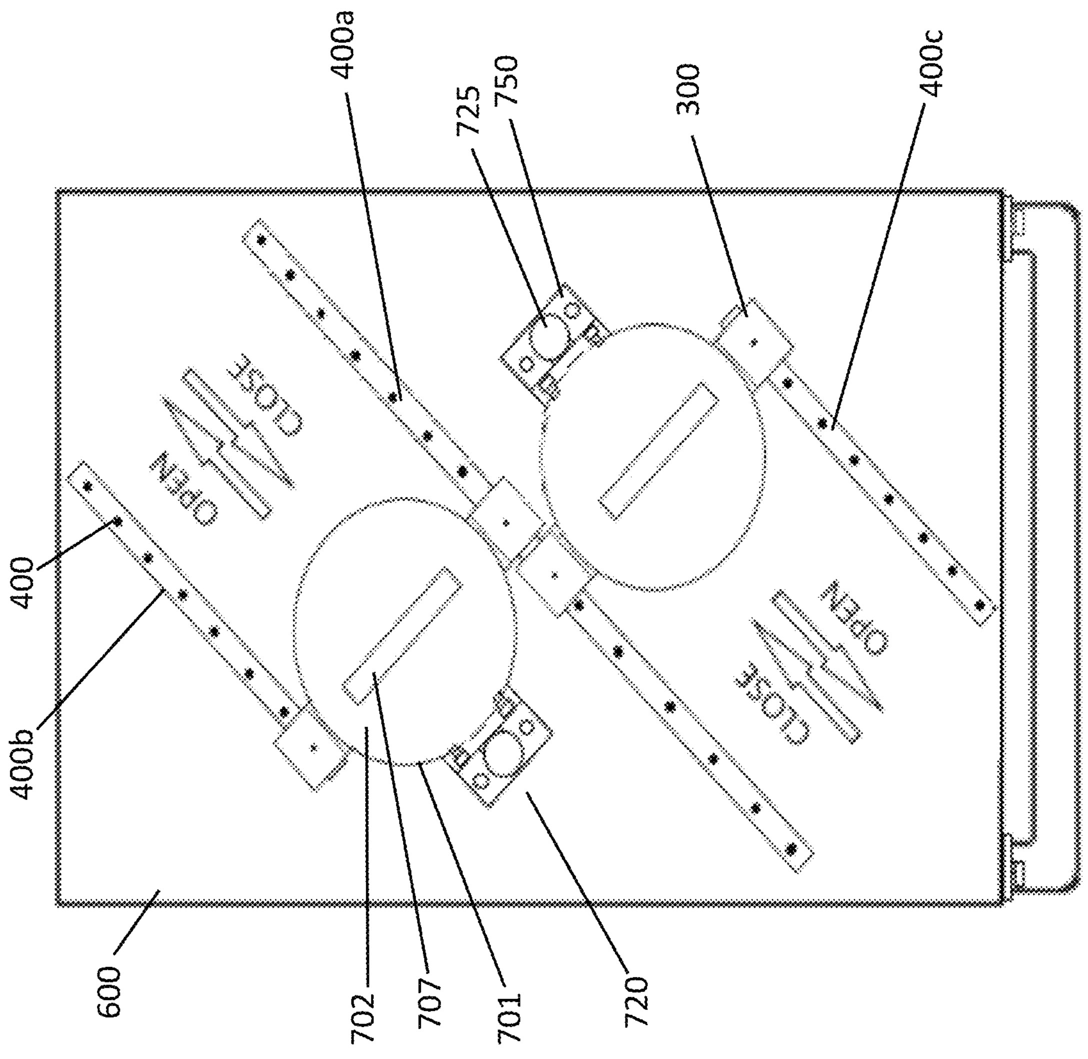
FIG. 7A illustrates a top view of a lid sliding system of a shielded radioactive storage device in accordance with various embodiments.
Figure 7B:
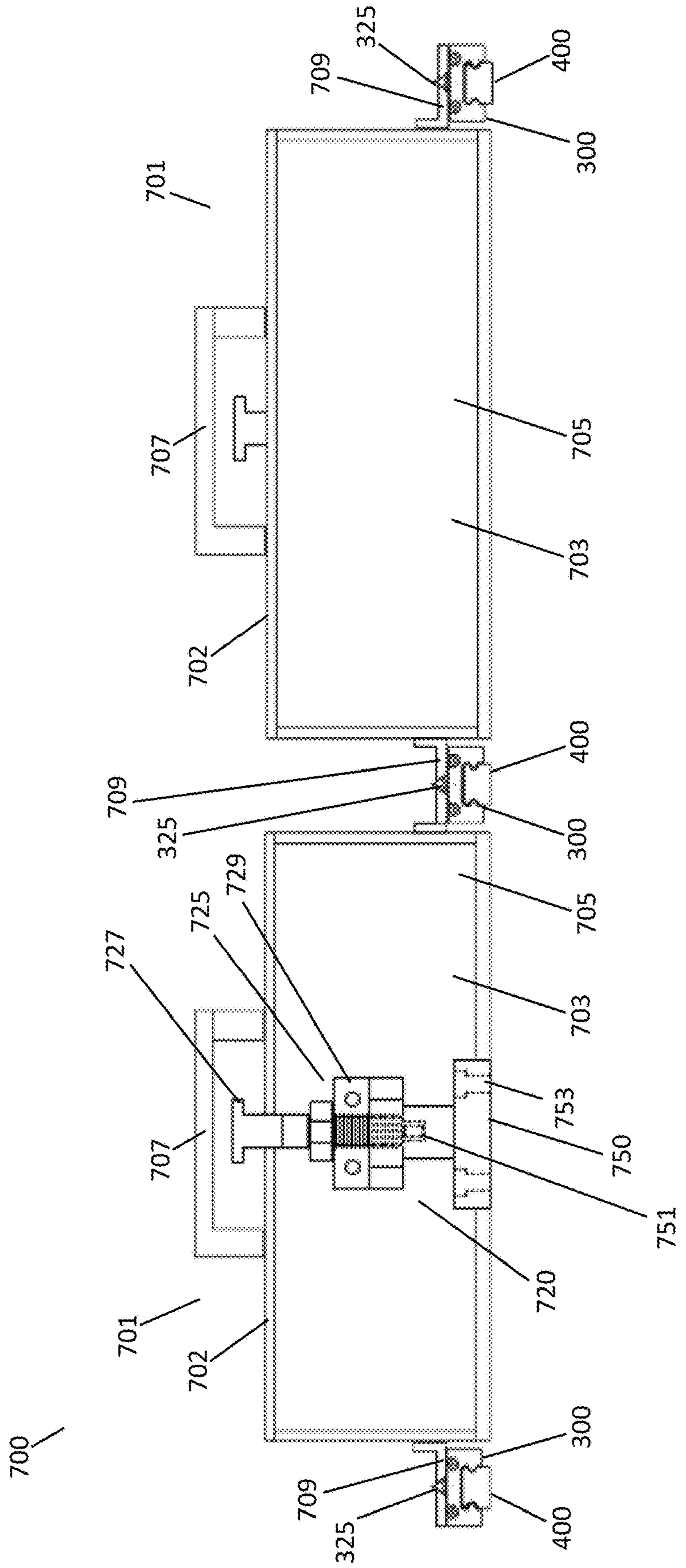
FIG. 7B illustrates a side cross-section of the lid sliding system of FIG. 7A.
Figure 7C:
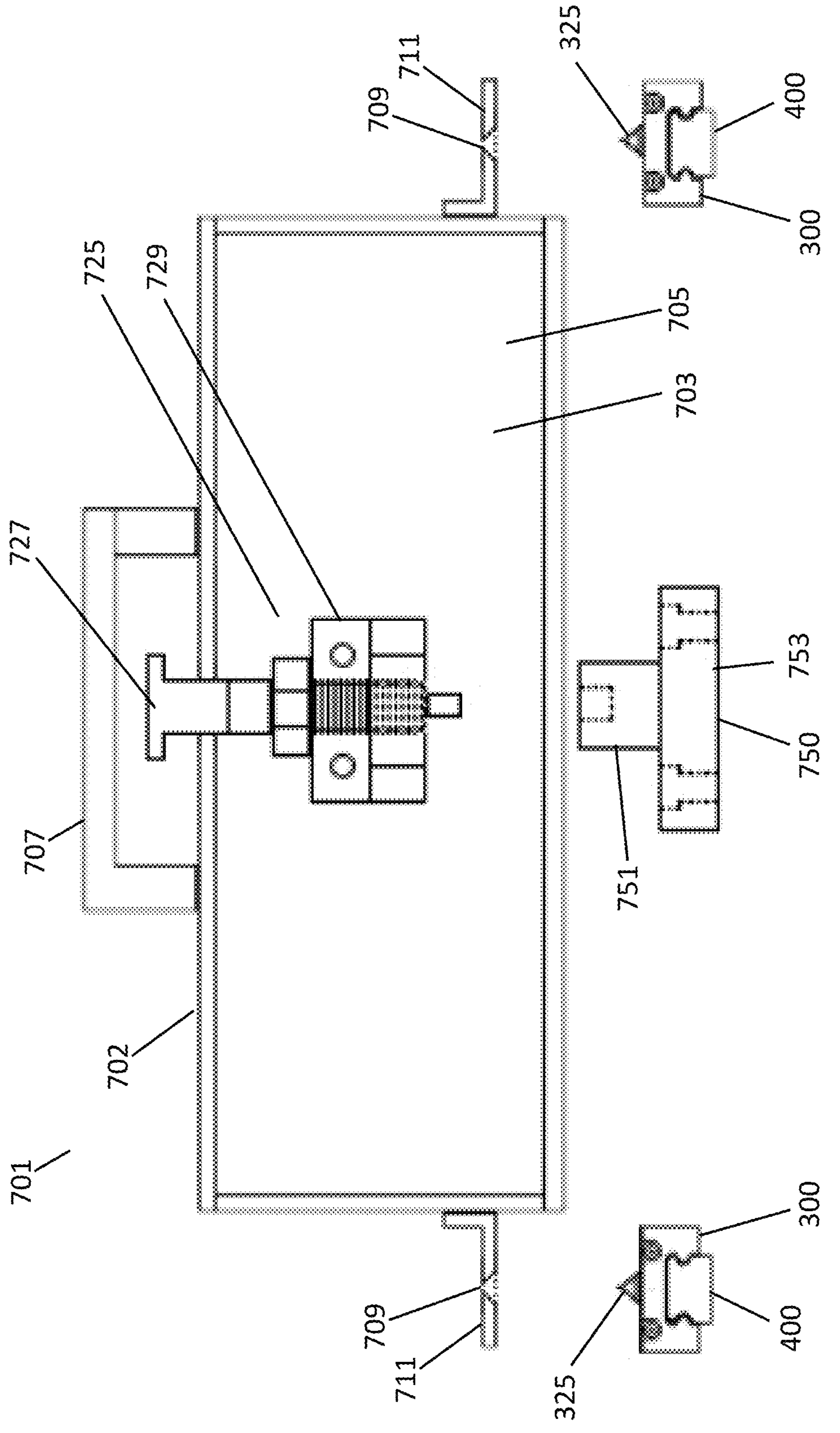
FIG. 7C illustrates a disassembled side cross-section of the lid sliding system of FIG. 7A.

As noted above, the openings of the well cavity 603 are removably shielded by lids 701 to permit insertion, extraction, and/or use of the radioactive payload being stored in the respective well cavity 603. Referring now to FIGS. 7A-7C, lids 701 are sized and shaped to at least cover the openings of the well cavity 603 and, preferably, to be larger than the well cavity opening to overlap the upper wall of the hollow body 600. The lids 701 include a sealed lid casing 702 defining a lid cavity 703, wherein the lid cavity 703 is at least partially filled with lid shielding material 705. The thickness of the radiation shielding material 705 can be configured to have any suitable thickness depending on the type and size of a radioactive payload to be stored in the well cavities 603. As noted above, Types and thicknesses of radiation shielding material 705 for common radiopharmaceutical isotopes are shown in FIG. 5 and, in some embodiments, the lid shielding cavity 703 can be sized to accommodate radiation shielding material 705 matching or exceeding any one or more such thicknesses. In some embodiments, the radiation shielding material 705 can be between about 6 mm to about 50.8 mm thick covering the opening of the well cavity 603. In some embodiments, to facilitate carrying and lifting of the lid 701, the lid 701 can also include a handle 707 extending from the lid casing 702 opposite the well cavity 603.

The lid casing 702 can be constructed from any suitable material including, for example, stainless steel, aluminum, tungsten, other metals, composites, plastics, combinations thereof, or any other suitable material. The lid shielding material 705 can be any suitable and effective radiation shielding material 705 such as lead, tungsten, high density concrete, borated polyethylene, metal impregnated polymers, aluminum, or any other suitable materials.

A lid sliding system 700 can be included to aid in opening and closing the well cavities 603 during insertion, extraction, and use of the radioactive payloads and for selectively retaining each lid 701 in the closed position. As best shown in FIGS. 7A-7C, the lid sliding system 700 can include two or more rails 400 attached to the upper wall of the hollow body 600 and two or more carriage assemblies 300 each configured to slide on a corresponding one of the rails 400. Each of the lids 701 includes opposing mounting brackets 709 extending outward from the lid casing 702 and having a mounting hole 711 defined therein for engaging a pin 325 of the carriage assembly 300. The mounting hole 711 can generally extend partially or completely through the mounting bracket 709 so long as the mounting hole 711 is of sufficient depth that the mounting bracket 709 rests on an upper surface of the carriage assembly 300 when the pin 325 is received in the mounting hole 711. In addition, the mounting hole can be a simple cylindrical through-hole (e.g., as in FIGS. 2B-2C) or can have any other cross-sectional shape (e.g., conical as in FIGS. 7B-7C) suitable for receiving the pin 325.

As discussed above with reference to FIGS. 6A-6I, a dual well configuration has several advantages with respect to weight, space savings, material usage, and cost. In addition, this configuration, particularly where the first and second well cavities 603 and well casings 605 are oriented at an angle to the hollow body 600, also provides the lid sliding system 700 with a configuration permitting simultaneous, independent opening and closure of the first and second lids 701.

As shown in FIGS. 7A-7C, a center rail 400*a* extends along the upper wall of the hollow body 600 between first and second wells and their corresponding lids 701. A first outer rail 400*b* extends parallel to the center rail 400*a* along or tangent to a side of the first well opposite the center rail 400*a*. A second outer rail 400*c* extends parallel to the center rail 400*a* along or tangent to a side of the second well opposite the center rail 400*a*.

The first outer rail 400*b* extends in a first direction toward a first side wall of the hollow body 600 and includes a carriage assembly 300 mounted thereto and configured to slide along the first outer rail 400*b* in the first direction. The second outer rail 400*c* extends in a second direction, opposite the first direction, toward an opposing side wall of the hollow body 600 and includes a carriage assembly 300 mounted thereto and configured to slide along the second outer rail 400*c* in the second direction. The center rail 400*a* extends in both the first and second directions, parallel to each of the first and second outer rails 400*b*, 400*c*, and includes two carriage assemblies 300 mounted thereto, wherein one of the center rail carriage assemblies 300 is configured to travel in the first direction and the other is configured to travel in the second direction.

Each of the carriage assemblies 300 includes at least one pin 325 for engagement with the mounting hole 711 of a corresponding one of the mounting brackets 709 to permit removable engagement with the corresponding lid 701. In some embodiments, the pin 325 can have a conformal shape for matching the cross-sectional shape of the mounting hole 711 (e.g., a cylindrical shape in FIGS. 2B-2C and a conical shape as shown in FIGS. 7B-7C). In some embodiments a conical shape of the pin 325 and corresponding mounting holes 711 can aid alignment of the lid 701 for engagement when replacing the lid onto the lid sliding system 700.

Thus, as shown in FIG. 7A, in use, the lid sliding system 700 permits simultaneous, independent sliding of each of the first and second lids 701 between a closed position covering the corresponding well, and an open position wherein the corresponding well is uncovered to permit insertion, removal, and/or use of the radioactive payload. Furthermore, because the lids move in opposing directions, the simultaneous operation can be achieved without obstruction of or interference with either well 603, permitting well cleaning, radioactive payload use, payload insertion, payload removal, or combinations thereof.

Referring now to FIGS. 7A-7C, the lid sliding system 700 can also include a lid locking system 720 for selectively retaining the lid 701 in the closed position. The lid locking system 720 advantageously prevents inadvertent opening of the lid 701 and, thus, the potential for unintended radiation exposure. The locking system 720 includes a pin portion 725 attached to the lid 701 for sliding therewith and a locking pin receiving portion 750 attached to the upper wall of the hollow body 600.

The pin portion 725 includes a lid mount 729 attached to the lid 701 and including an aperture formed therethrough for receiving and positioning a locking pin 727. In some embodiments the locking pin 727 can include a sprung detent, wherein the detent is spring-biased to an extended locking position. The locking pin 727 can also include a handle for use in retracting the detent from the extended locking position to a retracted non-locking position. In some embodiments the locking pin 727 and/or the lid mount 729 may include a retention mechanism to selectively maintain the detent of the locking pin 727 in the retracted non-locking position.

The locking pin receiving portion 750 can generally include a bracket portion 753 mounted to the upper wall of the body 600 and a detent engagement portion 751 extending vertically from the bracket portion 753 and including a recess defined therein for receiving the detent. The pin receiving portion can preferably be mounted to the upper wall of the body 600 between the corresponding two rails 400 on which the lid 701 is sliding such that, in the closed position of the lid 701, the detent of the locking pin 727 extends into and is received by the recess of the detent engagement portion 751 in order to selectively retain the lid 701 in the closed position. When a user desires to open the lid 701, the handle of the locking pin 727 can be manipulated (e.g., pulled or rotated) to retract the detent, thereby unlocking the lid locking system 720 and permitting the lid 701 to slide.

While example embodiments have been particularly shown and described, it will be understood by those skilled in the art that various changes in form and details may be made therein without departing from the scope of the embodiments encompassed or contemplated herein.

As used herein, "consisting essentially of" allows the inclusion of materials or steps that do not materially affect the basic and novel characteristics of the claim. Any recitation herein of the term "comprising", particularly in a description of components of a composition or in a description of elements of a device, can be exchanged with "consisting essentially of" or "consisting of".

What is claimed is:

1. A shielded radioactive storage device comprising:

a hollow body having an upper wall, a bottom wall, and at least one side wall defining an interior cavity;

a first well positioned within the interior cavity and including a first well casing having a first well casing bottom and a first well casing side defining a first well cavity having a first well opening defined as a first aperture formed in the upper wall of the hollow body, the first well cavity and first well opening sized to receive a radioactive payload;

a second well positioned within the interior cavity and including a second well casing having a second well casing bottom and a second well casing side defining a second well cavity having a second well opening defined as a second aperture formed in the upper wall of the hollow body, the second well cavity and second well opening sized to receive a second radioactive payload;

a shield casing having a shield casing bottom and a shield casing side extending around and spaced apart from the first and second well casing bottoms and the first and second well casing sides to form a shielding cavity between the shield casing and the first and second well casings; and radiation shielding material filling the shielding cavity to surround the first and second well casing sides and first and second well casing bottoms.

2. The shielded radioactive storage device of claim 1, wherein at least a portion of the shield casing is attached to the side wall of the hollow body.

3. The shielded radioactive storage device of claim 1, further comprising a structural frame including structural members extending along the bottom wall, side wall, and upper wall.

4. The shielded radioactive storage device of claim 1, wherein the shield casing bottom is in supportive contact with at least one support member extending through the interior cavity below the shield casing bottom.

5. The shielded radioactive storage device of claim 1, further comprising:

a first lid sized to cover the first well opening; and a second lid sized to cover the second well opening.

6. The shielded radioactive storage device of claim 5, each of the first and second lids including a lid casing having lid radiation shielding material disposed therein.

7. The shielded radioactive storage device of claim 6, the lid casing of each of the first and second lids including a handle attached thereto.

8. The shielded radioactive storage device of claim 5, further comprising:

a center rail extending along the upper wall of the hollow body between the first and second well openings;

a first outer rail extending parallel to the center rail along or tangent to a side of the first well opening opposite the center rail; and a second outer rail extending parallel to the center rail along or tangent to a side of the second well opening opposite the center rail.

9. The shielded radioactive storage device of claim 8, further comprising:

a first center carriage configured to move along the center rail in a first direction;

a first outer carriage configured to move along the first outer rail in the first direction;

a second center carriage configured to move along the center rail in a second direction; and a second outer carriage configured to move along the second outer rail in the second direction.

10. The shielded radioactive storage device of claim 9, wherein:

each of the first outer carriage, the first center carriage, the second center carriage, and the second outer carriage includes a pin extending therefrom;

the first and second lid each include opposing mounting brackets extending therefrom;

the mounting brackets of the first lid configured to engage with the respective pins of the first outer carriage and the first center carriage for sliding along the center rail and the first outer rail between a first closed position covering the first well opening and a first open position uncovering the first well opening; and the mounting brackets of the second lid configured to engage with the respective pins of the second outer carriage and the second center carriage for sliding along the center rail and the second outer rail between a second closed position covering the second well opening and a second open position uncovering the second well opening.

11. The shielded radioactive storage device of claim 10, wherein at least one of the first outer rail, the center rail, the first outer carriage, the first center carriage, or combinations thereof include a first stop mechanism to retain the first lid in the first closed and/or first open position and at least one of the second outer rail, the center rail, the second outer carriage, the second center carriage, or combinations thereof include a second stop mechanism to retain the second lid in the second closed and/or second open position.

12. The shielded radioactive storage device of claim 10, wherein the first and second lids, in the respective first and second closed positions, are spaced apart from the upper wall of the hollow body.

13. The shielded radioactive storage device of claim 1, wherein the hollow body includes one or more legs extending outward from the bottom wall.

14. The shielded radioactive storage device of claim 13, wherein at least one of the legs includes a caster.

15. The shielded radioactive storage device of claim 1, wherein the radiation shielding material filling the shielding cavity is at least one of lead or tungsten.

16. The shielded radioactive storage device of claim 1, wherein a thickness of the radiation shielding material filling the shielding cavity surrounding the first and second well casing sides and first and second well casing bottoms meets legal and/or industry standard shielding requirements for an isotope of a radioactive payload to be stored.

17. The shielded radioactive storage device of claim 1, wherein the radioactive payload to be stored is a radiopharmaceutical elution generator.

18. The shielded radioactive storage device of claim 16, wherein the radiation shielding material filling the shielding cavity surrounding the first and second well casing sides and first and second well casing bottoms is between 6 mm to 50.8 mm thick.

19. The shielded radioactive storage device of claim 1, wherein the first and second well casings, the shield casing, and the hollow body are each constructed of at least one of iron, steel, stainless steel, tungsten, aluminum, metal alloys, composite materials, or combinations thereof.

20. The shielded radioactive storage device of claim 1, wherein the hollow body includes two opposing side walls and wherein the shield casing is attached to each of the opposing side walls.

21. The shielded radioactive storage device of claim 1, wherein a shape of each of the first and second well openings is one or more of circular, square, rectangular, rhombic, pentagonal, hexagonal, pentangular, star-shaped, polygonal, triangular, or combinations thereof.

22. The shielded radioactive storage device of claim 1, wherein a cross-sectional area of a portion of the shielding cavity between the shield casing bottom and the first and second well casing bottoms is smaller than a cross-sectional area of the shielding cavity between the first and second well casing bottoms and the upper wall of the hollow body.

* * * * *